United States Patent
Kim et al.

(10) Patent No.: US 11,097,313 B2
(45) Date of Patent: Aug. 24, 2021

(54) TACTILE ACTUATOR AND CONTROL METHOD THEREFOR

(71) Applicant: CK MATERIALS LAB CO., LTD., Guro-gu Seoul (KR)

(72) Inventors: Hyeong Jun Kim, Seoul (KR); Jong Hun Lee, Seoul (KR); Jeong Bum Lee, Seoul (KR); Ji Goo Kang, Seoul (KR); Jong Hyung Jung, Seoul (KR)

(73) Assignee: CK MATERIALS LAB CO., LTD., Seoul (KR)

( * ) Notice: Subject to any disclaimer, the term of this patent is extended or adjusted under 35 U.S.C. 154(b) by 0 days.

(21) Appl. No.: 15/763,208

(22) PCT Filed: Jun. 21, 2016

(86) PCT No.: PCT/KR2016/006548
§ 371 (c)(1),
(2) Date: Mar. 26, 2018

(87) PCT Pub. No.: WO2017/188507
PCT Pub. Date: Nov. 2, 2017

(65) Prior Publication Data
US 2019/0039092 A1 Feb. 7, 2019

(30) Foreign Application Priority Data

Apr. 29, 2016 (KR) .................. 10-2016-0052751
Jun. 20, 2016 (KR) .................. 10-2016-0076452

(51) Int. Cl.
*B06B 1/04* (2006.01)
*G06F 3/01* (2006.01)
*H02K 33/02* (2006.01)

(52) U.S. Cl.
CPC ............. *B06B 1/045* (2013.01); *G06F 3/01* (2013.01); *G06F 3/016* (2013.01); *H02K 33/02* (2013.01)

(58) Field of Classification Search
CPC ................... H02K 1/31; H02K 7/065
(Continued)

(56) References Cited

U.S. PATENT DOCUMENTS

2003/0076298 A1   4/2003   Rosenberg
2007/0085425 A1   4/2007   Hirashima
(Continued)

FOREIGN PATENT DOCUMENTS

EP      1967290 A1      9/2008
JP      2007-111619 A   5/2007
(Continued)

OTHER PUBLICATIONS

Dahiya, Ravinder S. et al., "Tactile Sensing—From Humans to Humanoids," IEEE Transactions on Robotics, 1552-3098, dated Nov. 5, 2008, Jun. 29, 2009 and Sep. 22, 2009, 20 pages.
(Continued)

*Primary Examiner* — Quyen P Leung
*Assistant Examiner* — Minki Chang
(74) *Attorney, Agent, or Firm* — Stuart H. Mayer; Mayer & Williams PC

(57) ABSTRACT

According to one embodiment, a tactile actuator can comprise: a housing having an accommodation space therein; a cap covering at least a portion of the accommodation space; a vibration unit disposed inside the accommodation space; an elastic member for connecting the housing and the vibration unit such that the vibration unit can vibrate with respect to the housing; a coil for forming a magnetic field to drive the vibration unit; and a control unit for determining any one driving mode on the basis of collected driving
(Continued)

information from among a plurality of preset driving modes and determining, according to the driving mode, the characteristic of a current to be applied to the coil.

10 Claims, 29 Drawing Sheets

(58) Field of Classification Search
USPC .................................................. 310/15–39
See application file for complete search history.

(56) References Cited

U.S. PATENT DOCUMENTS

| 2011/0254782 A1 | 10/2011 | Park et al. | |
|---|---|---|---|
| 2011/0260560 A1* | 10/2011 | Park | H02K 33/16 310/25 |
| 2013/0311881 A1* | 11/2013 | Birnbaum | G06F 3/0485 715/702 |
| 2016/0103493 A1 | 4/2016 | Taninaka et al. | |
| 2016/0144404 A1* | 5/2016 | Houston | B06B 1/166 318/114 |

FOREIGN PATENT DOCUMENTS

| JP | 2008-225690 A | 9/2008 |
|---|---|---|
| JP | 2011-249857 A | 12/2011 |
| JP | 2013-97764 A | 5/2013 |
| KR | 10-2011-0118584 | 10/2011 |
| KR | 10-1242525 | 3/2013 |
| KR | 10-1320185 | 10/2013 |
| KR | 2013-0129127 | 11/2013 |
| KR | 10-1603957 | 3/2016 |
| KR | 2016-0040062 | 4/2016 |
| WO | 2016-021834 | 2/2016 |

OTHER PUBLICATIONS

International Search Report, issued for PCT/KR2016/006548, dated Jan. 26, 2017, 3 pages.

Written Opinion, issued for PCT/KR2016/006548, dated Jan. 26, 2017, 6 pages.

* cited by examiner

TACTILE ACTUATOR AND CONTROL METHOD THEREFOR

TECHNICAL FIELD

Embodiments relate to a tactile actuator and a control method therefor.

BACKGROUND

Formerly, information was exchanged between electronic devices and humans mainly through visual or auditory transmission. Recently, haptic technology is emerging as technology for transmitting more specific and realistic information.

In general, haptic devices for haptic technology include an inertial actuator, a piezoelectric actuator, and an electro-active polymer actuator (EAP).

The inertial actuator includes an eccentric rotation motor (ERM) that vibrates using an eccentric force generated by a weight body connected to a magnetic circuit, and a linear resonant actuator (LRA) that maximizes an intensity of vibration using a resonant frequency generated by a weight body connected to a magnetic circuit and an elastic spring.

The piezoelectric actuator is a device that is driven in a form of a bar or a disk using an elastic body, around a piezoelectric device with a shape that instantaneously deforms by an electric field.

In relation to the piezoelectric actuator, among the existing haptic devices, there were published Korean Patent Publication No. 10-1603957 (entitled Piezoelectric Actuator, Piezoelectric Vibration Apparatus, and Portable Terminal), and Korean Patent Application Publication No. 10-2011-0118584 (entitled Transparent Composite Piezoelectric Combined Touch Sensor and Haptic Actuator).

The EAP is a device that is driven by providing repeated motions using an electro-active polymer film attached to a mass body, on the main principle that a shape thereof deforms by a functional group of a polymer backbone having a specific mechanism by external electric power.

Further, in addition to the above haptic devices, haptic devices using shape-memory alloys, electrostatic forces, or ultrasonic waves are being developed.

The above existing haptic devices merely transmit simple vibration. Besides, the LRA may vibrate effectively only when using a resonant frequency determined by the mass body and the spring. The piezoelectric actuator uses a fragile material and thus may not achieve a sufficient durability life for an operator. Last, the EAP has an issue of durability against external oxidation, and requires a large amount of voltage for actual driving, and thus may be difficult to apply to various devices.

Furthermore, according to the paper (entitled Tactile Sensing—From Humans to Humanoids) published in the world-wide journal, IEEE TRANSACTIONS ON ROBOTICS of 2010, a frequency of a tactile sense acceptable to a human body ranges from 0.4 hertz (Hz) to 500 Hz. However, when the existing haptic technology is used, only vibration within the range of 160 Hz to 210 Hz may be provided, and thus more diverse and complex information may not be transmitted effectively. To solve the above issue effectively, research on an apparatus for effectively transmitting a tactile signal within various frequency ranges is needed.

The existing haptic devices may seem to solve the above issue by widening a bandwidth of a driving frequency to provide vibration efficiently. However, due to a structure that simultaneously provides sound and vibration of above 160 Hz, the vibration may be provided in company with noise.

In addition, there is no apparatus that may provide a tactile sense including vibration in a low frequency region below 160 Hz.

Thus, there is a need for developing an apparatus that may provide a tactile sense in a region below 160 Hz, and provide a tactile sense in various ranges, rather than simply a single frequency region.

SUMMARY

Technical Goals

As contrived to solve all the issues of the existing technology, in addition to market needs for a new tactile sense with the development of haptic technology, embodiments provide a tactile device for providing a more sensitive tactile sense for various situations, that is, a tactile actuator.

An aspect provides a tactile actuator having at least two driving modes (operation modes) to suggest different tactile senses in at least two distinguishing frequency bands and a control method therefor.

In detail, the aspect provides a tactile actuator that has at least one resonant frequency below 160 Hz through a combination of an elastic member and a vibrator (mess body), provides vibration that is provided by the existing technology at a corresponding point, and simultaneously has a driving section to suggest another tactile sense at a point below ⅓ the resonant frequency.

Another aspect provides a tactile actuator that suggests different tactile senses by an external magnetic force through electric signals of different waveforms, even at the same frequency.

Technical Solutions

According to an aspect, there is provided a tactile actuator including a housing having an accommodation space therein, a cap configured to cover at least a portion of the accommodation space, a vibrator disposed in the accommodation space, an elastic member configured to connect the housing and the vibrator such that the vibrator vibrates with respect to the housing, a coil configured to form a magnetic field to drive the vibrator, and a controller configured to determine one of a plurality of preset driving modes based on collected driving information, and determine a characteristic of a current to be applied to the coil based on the determined driving mode.

A mass of the vibrator may be below 2 grams (g), an elasticity coefficient of the elastic member may be below 2.021 newtons per millimeter (N/mm), and a resonant frequency of the tactile actuator may be below 160 hertz (Hz).

The controller may be configured to determine a frequency of the current to be a first set frequency when the driving mode is a first set mode, and determine the frequency of the current to be a second set frequency when the driving mode is a set mode other than the first set mode, the second set frequency being lower than the first set frequency.

The first set frequency may be a value below 160 Hz.

The second set frequency may be a value below ⅓ the resonant frequency of the tactile actuator.

The controller may be configured to determine a waveform of the current to be a square wave or a pulse wave when the driving mode is a second set mode, and determine the waveform of the current to be a sine wave when the driving mode is a third set mode.

The driving mode may include a general vibration mode, a tapping mode, and a rolling mode.

The controller may be configured to determine a frequency of the current to be a first set frequency when the driving mode is the general vibration mode, determine the frequency of the current to be a second set frequency when the driving mode is the tapping mode, the second set frequency being lower than the first set frequency, and determine the frequency of the current to be a third set frequency when the driving mode is the rolling mode, the third set frequency being higher than the second set frequency and lower than the first set frequency.

The tactile actuator may further include an information providing device configured to provide information collected by the controller, and the information providing device may include at least one of a user interface configured to receive an instruction of a user, a sensor configured to sense an external environment, a memory configured to store data, and a communicator configured to receive information through communication with another communication device.

According to an aspect, there is provided a control method for a tactile actuator, the control method including collecting driving information, determining one of a plurality of preset driving modes based on the collected driving information, determining a frequency of a current to be applied to the coil based on the determined driving mode, and applying the current to the coil.

The control method may further include determining a waveform of the current to be applied to the coil based on the determined driving mode.

The driving information may be an image or a sound to be played back in a device connected to the tactile actuator, and the determining of the driving mode may include determining the driving mode in real time based on whether the image or the sound includes a preset image pattern or a preset audio pattern.

Effects

According to embodiments, various tactile senses may be transmitted more sensitively.

According to embodiments, in a frequency range below 160 Hz, of a frequency range that may be sensed by a human body, tactile senses may be provided more efficiently than the existing technology.

According to embodiments, through a single tactile device, at least two different tactile senses may be provided within a frequency range below 160 Hz.

DETAILED DESCRIPTION

Figure 1:
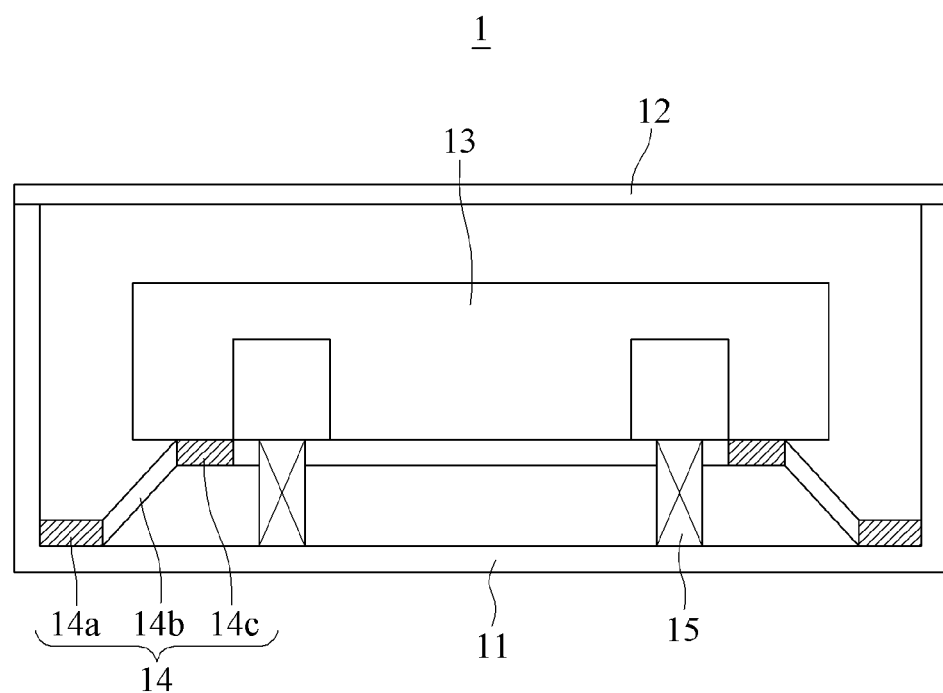
FIG. 1 illustrates an inside of a tactile actuator according to an embodiment.

Hereinafter, embodiments of the present disclosure will be described with reference to the accompanying drawings. Regarding the reference numerals assigned to the components in the drawings, it should be noted that the same components will be designated by the same reference numerals, wherever possible, even though they are shown in different drawings. Also, in the description of the embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. Each of these terms is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

The same name may be used to describe a component included in an embodiment and a component having a common function in another embodiment. Unless otherwise mentioned, the description on the embodiment may be applicable to the other embodiment and thus, duplicated description will be omitted for conciseness.

Figure 2:
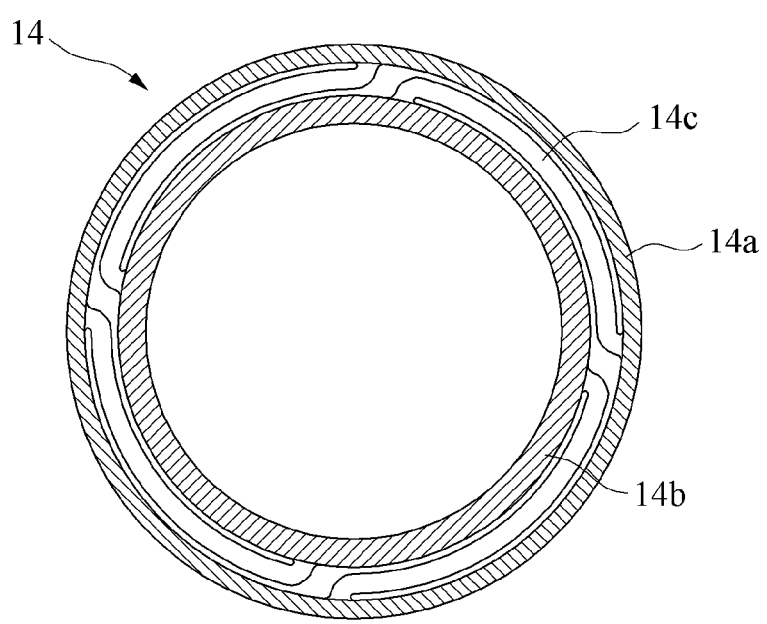
FIG. 2 illustrates an elastic member according to an embodiment.
Figure 3:
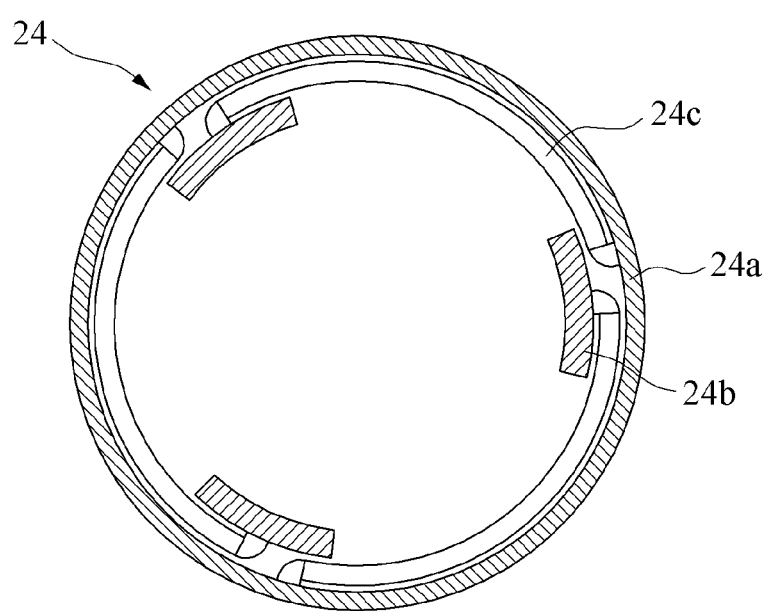
FIG. 3 illustrates an elastic member according to another embodiment.
Figure 4:
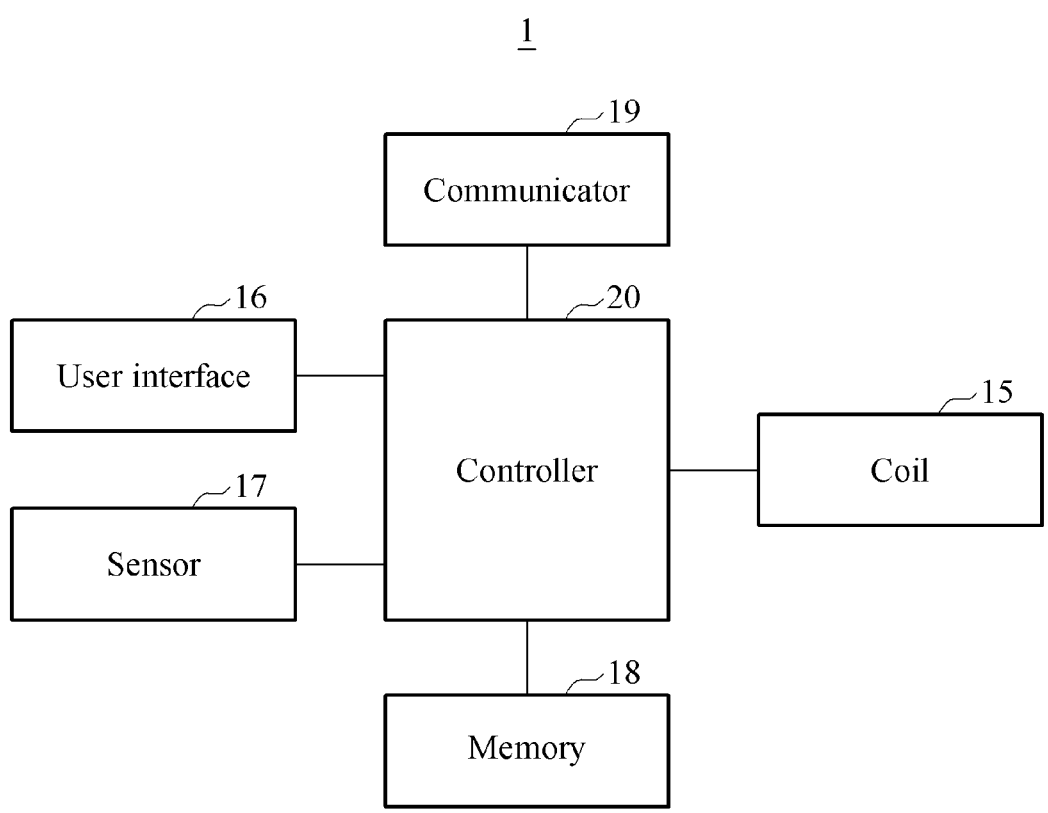
FIG. 4 is a block diagram of a tactile actuator according to an embodiment.

FIG. 1 illustrates an inside of a tactile actuator according to an embodiment, FIG. 2 illustrates an elastic member according to an embodiment, FIG. 3 illustrates an elastic member according to another embodiment, and FIG. 4 is a block diagram of the tactile actuator according to an embodiment.

Referring to FIGS. 1 through 4, a tactile actuator 1 may include a housing 11, a cap 12, a vibrator 13, an elastic member 14, a coil 15, a user interface 16, a sensor 17, a memory 18, a communicator 19, and a controller 20.

The housing 11 may include, for example, an accommodation space with an opened top. Although the housing 11 is illustrated as a box shape, the shape of the housing 11 is not limited thereto.

The cap 12 may cover at least a portion of the accommodation space. An edge portion of the cap 12 may be fixed to a side wall of the housing 11. Through a body of a user in direct or indirect contact with the cap 12, vibration generated by the vibrator 13 may be transmitted. For example, the cap 12 may include a more flexible material than the housing 11, so as to properly transmit a tactile sense such as vibration, tapping, or rolling of the vibrator 13 to the user.

The vibrator 13 may be disposed in the accommodation space of the housing 11, and may be driven by a magnetic field generated by a current applied to the coil 15. The vibrator 13 may include a material to be driven by the magnetic field. The vibrator 13 may be construed as a "magnetic circuit and mass body".

For example, the vibrator 13 may be made of soft magnetic materials having intrinsic coercivities below at least 1000 amperes/meter (A/m), among ferromagnetic materials, and include a material having a structure such as steel, powder, alloy, alloy powder, composites, or a nanostructure including at least one of elements such as Fe, Ni, Si, Mn, and Zn. The overall configuration may not need to be made of a single material.

In another example, the vibrator 13 may include a material purely including Cu or W having a specific gravity over 8, among paramagnetic materials, or a material having a structure such as alloy, alloy powder, composites, or a nanostructure including at least one of the soft magnetic elements such as Fe, Ni, Si, Mn, and Zn mentioned above. Similarly, the material and the structure of the magnetic circuit and mass body may not need to be uniform.

A portion of the vibrator 13 may include a material having a structure such as steel, powder, alloy, alloy powder, composites, or a nanostructure including at least one of elements such as Fe, Co, Ni, Nd, Ni, B, and Zn as the ferromagnetic materials, and include a material magnetized such that the N pole and the S pole thereof may be distinguished in a vertical direction of FIG. 1.

The elastic member 14 may connect the housing 11 and the vibrator 13 such that the vibrator 13 may vibrate with respect to the housing 11. For example, the elastic member 14 may include a low paramagnetic or diamagnetic material, for example, stainless steel, plastic, or rubber, which has an elasticity that may deform by an external force and be restored to its original shape immediately when the external force disappears.

The elastic member 14 may include a fixture 14a fixed to the housing 11, a support 14b configured to support the vibrator 13, and a connector 14c configured to connect the fixture 14a and the support 14b. For example, a diameter of the fixture 14a may be greater than a diameter of the support 14b.

Meanwhile, although FIGS. 1 and 2 exemplarily illustrate a case in which the fixture 14a and the support 14b are ring-shaped, a support 24b of an elastic member 24 may include a plurality of segments, as shown in FIG. 3, which may also apply to the fixture 14a.

The coil 15 may form a magnetic field to drive the vibrator 13 using the current applied thereto. For example, the coil 15 may include a planar coil, a solenoid coil, or an electromagnetic coil having a core including soft magnetic materials.

The user interface 16 may receive an instruction directly from the user. For example, the user interface 16 may be a keyboard, a mouse, or a touch panel. However, the type of the user interface 16 is not limited thereto.

The sensor 17 may sense an external environment of the tactile actuator 1. For example, the sensor 17 may sense temperature, humidity, pressure, or light intensity, convert the sensed information into an electric signal, and transmit the electric signal to the controller 20. However, the type of the sensor 17 is not limited thereto.

The memory 18 may store data. For example, data such as an image, a sound, a photograph, or a text may be stored in the memory 18. Data received from the user interface 16, the sensor 17, and/or the communicator 19 may also be stored in the memory 18. A plurality of preset driving modes may also be stored in the memory 18.

The communicator 19 may receive information through wired or wireless communication with another communication device. For example, the communicator 19 may receive external data such as an image, a sound, a photograph, or a text through the Internet, and transmit the external data to the controller 20.

The user interface 16, the sensor 17, the memory 18, and the communicator 19 may be collectively referred to as an "information providing device". The information providing device may provide driving information collected by the controller 20. An embodiment relates to a tactile actuator that may operate in a plurality of driving modes based on information provided from the information providing device to a controller. However, the type of the collected information or the type of the device providing the information is not limited thereto.

The controller 20 may determine one of the plurality of preset driving modes based on the collected driving information. Here, the driving information collected by the controller 20 may be information received from the information providing device. The controller 20 may determine a characteristic of a current to be applied to the coil 15 based on the determined driving mode. Here, the characteristic of the current may include a voltage, a frequency, and a waveform.

An embodiment may enable vibration in a low frequency region by changing a physical property of the elastic member 14. Table 1 showing an elasticity coefficient of an elastic member induced from a mass of a vibrator and a resonant frequency of an existing tactile actuator based on the following Equation 1, and Table 2 showing an elasticity coefficient of the elastic member 14 of the tactile actuator 1 are suggested as follows.

$$f = \frac{1}{2\pi}\sqrt{\frac{k}{m}} \quad \text{[Equation 1]}$$

TABLE 1

Elasticity Coefficients of Elastic Members Used for Existing Tactile Actuator

| Spring No. | Measured Freq. (Hz) | Mass (g) | Induced Spring Constant (N/mm) |
| --- | --- | --- | --- |
| 1 | 154.7 | 1.578 | 1.491 |
| 2 | 154.1 | 1.578 | 1.479 |
| 3 | 152.7 | 1.578 | 1.453 |
| 4 | 149.8 | 1.578 | 1.398 |
| 5 | 153.0 | 2.23 | 2.061 |
| 6 | 160.0 | 2.23 | 2.254 |

TABLE 2

Elasticity Coefficients of Elastic Members Used for Tactile Actuator According to Embodiment

| Spring No. | Measured Freq. (Hz) | Mass (g) | Induced Spring Constant (N/mm) |
| --- | --- | --- | --- |
| 7 | 98.7 | 0.65 | 0.250 |
| 8 | 81.4 | 0.79 | 0.207 |
| 9 | 75.7 | 0.93 | 0.210 |
| 10 | 85.3 | 1.09 | 0.313 |
| 11 | 78.2 | 1.04 | 0.251 |

Referring to Table 1 and Table 2, the elasticity coefficient of the elastic member 14 may be set to be over 0.2 newtons per millimeter (N/mm) and below 0.35 N/mm such that a tactile actuator including, for example, the vibrator 13 with a mess ranging from 0.6 to 1.1 grams (g) may have a low resonant frequency below 100 Hz.

Figure 5:
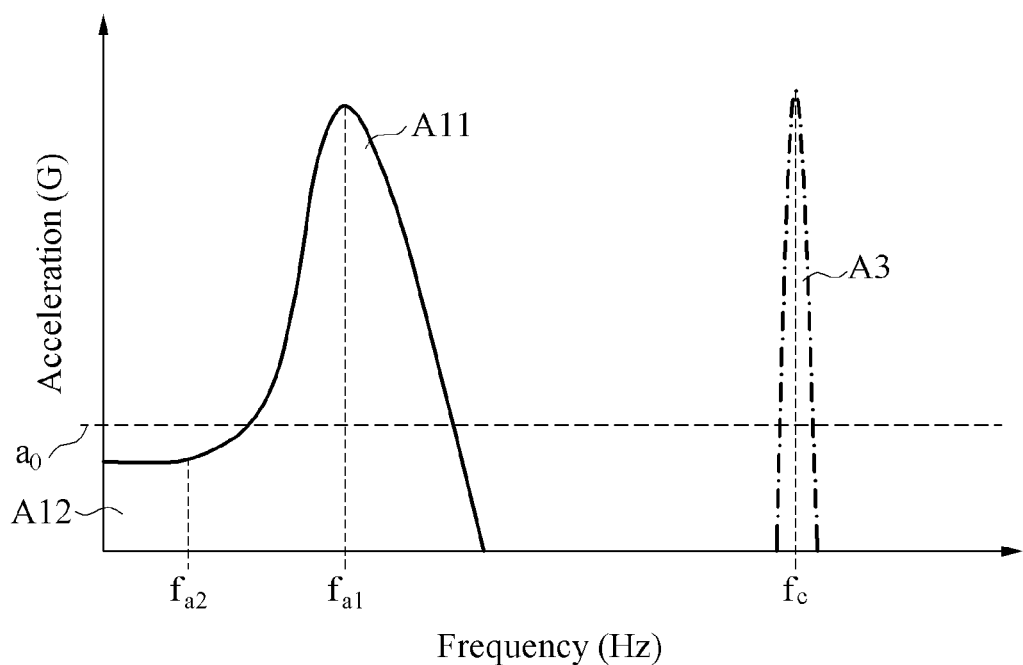
FIG. 5 is a graph conceptually illustrating a driving region with respect to a frequency, in a tactile actuator according to an embodiment.
Figure 6:
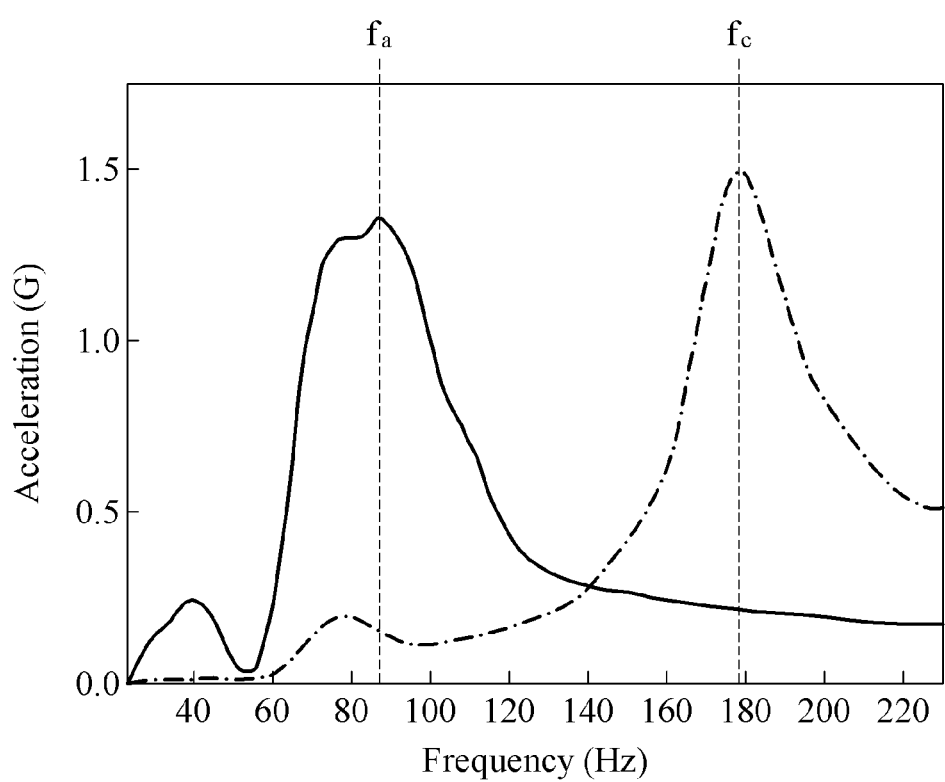
FIG. 6 is a graph illustrating a relationship between an actually measured frequency and an acceleration, in a tactile actuator according to an embodiment.

FIG. 5 is a graph conceptually illustrating a driving region with respect to a frequency, in a tactile actuator according to an embodiment, and FIG. 6 is a graph illustrating a relationship between an actually measured frequency and an acceleration, in the tactile actuator according to an embodiment.

A solid line is a graph illustrating an operation of the tactile actuator 1, a dot-and-dash line is a graph illustrating an operation of an existing general linear resonant actuator (LRA), and a broken line is a graph illustrating an operation of a multifunction vibration actuator with an improved driving frequency band from the existing general LRA.

Referring to FIGS. 5 and 6, the tactile actuator 1 may have at least two driving modes based on the current applied to the coil 15.

Referring to the graph (dot-and-dash line) of the existing general LRA, the existing general LRA has a maximum vibration force at a single resonant frequency f_c above 170 Hz, and has a drivable frequency band in a relatively narrow frequency band A3.

Since existing tactile methods are limited to vibration, outputs in a frequency band in which periodic vibration is not formed were defined as noise and ignored, and thus the tactile methods failed to provide various tactile senses.

Meanwhile, referring to the graph (solid line) of the tactile actuator, the tactile actuator has at least one resonant frequency f_a1 below 160 Hz, and may suggest a tactile sense in a form of vibration that is output from an existing haptic device in a frequency band A11 including the corresponding resonant frequency f_a1.

Further, in a region below a threshold frequency f_a2 which is approximately ⅓ the corresponding resonant frequency f_a1, the tactile actuator includes at least one different frequency band A12 in which a force may be provided, rather than vibration, and the corresponding force may be tactile senses such as tapping and rolling. Here, the threshold frequency may be a minimum frequency at which periodic vibration is formed without showing collapse of a waveform generated based on an input current.

Figure 7:
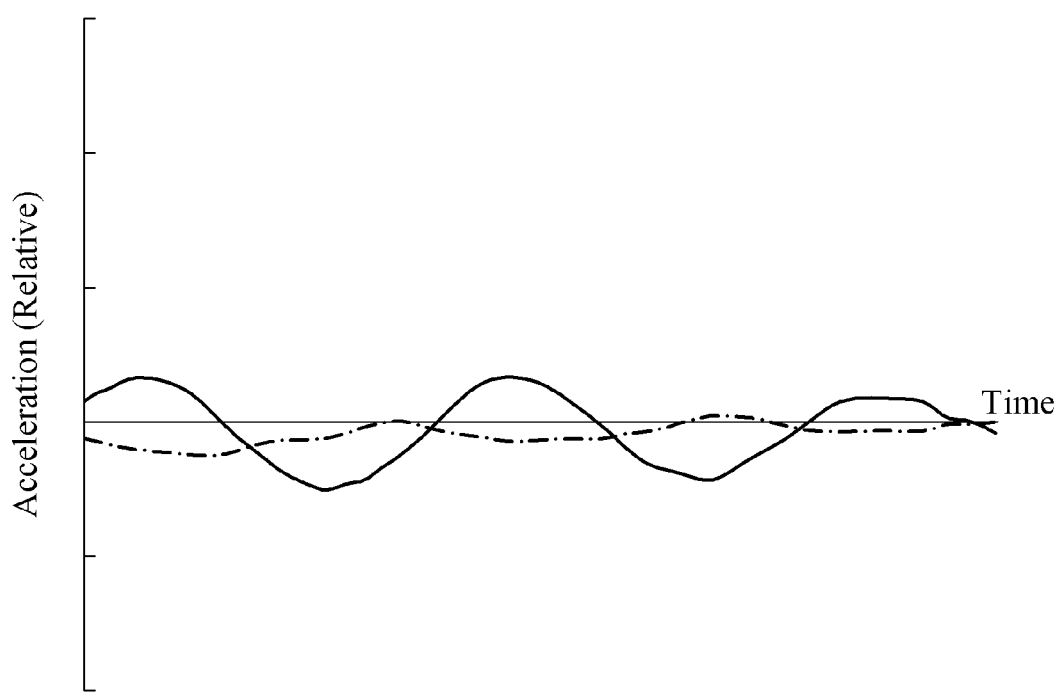
FIG. 7 is a graph illustrating a relationship between a measured frequency and an acceleration when a square wave current having a low frequency is applied, in a tactile actuator according to an embodiment.
Figure 8:
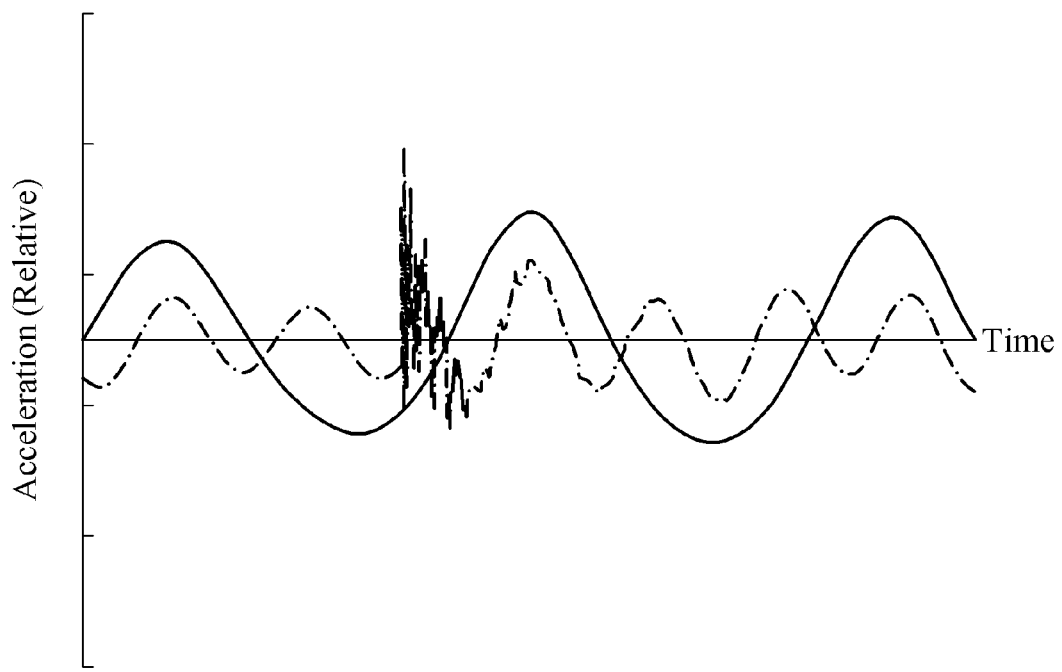
FIG. 8 is a graph illustrating a relationship between a measured frequency and an acceleration when a sine wave current having a low frequency is applied, in a tactile actuator according to an embodiment.

FIG. 7 is a graph illustrating a relationship between a measured frequency and an acceleration when a square wave current having a low frequency is applied, in a tactile actuator according to an embodiment, and FIG. 8 is a graph illustrating a relationship between a measured frequency and an acceleration when a sine wave current having a low frequency is applied, in the tactile actuator according to an embodiment.

A solid line is a graph illustrating an operation of the tactile actuator 1, and a dot-and-dash line is a graph illustrating an operation of the existing general LRA.

Referring to FIGS. 7 and 8, when a current of a low frequency flows, the existing general LRA showed noise unsuitable for actual use, whereas the tactile actuator 1 showed a vibration pattern suitable for a waveform of the provided external current.

Figure 9:
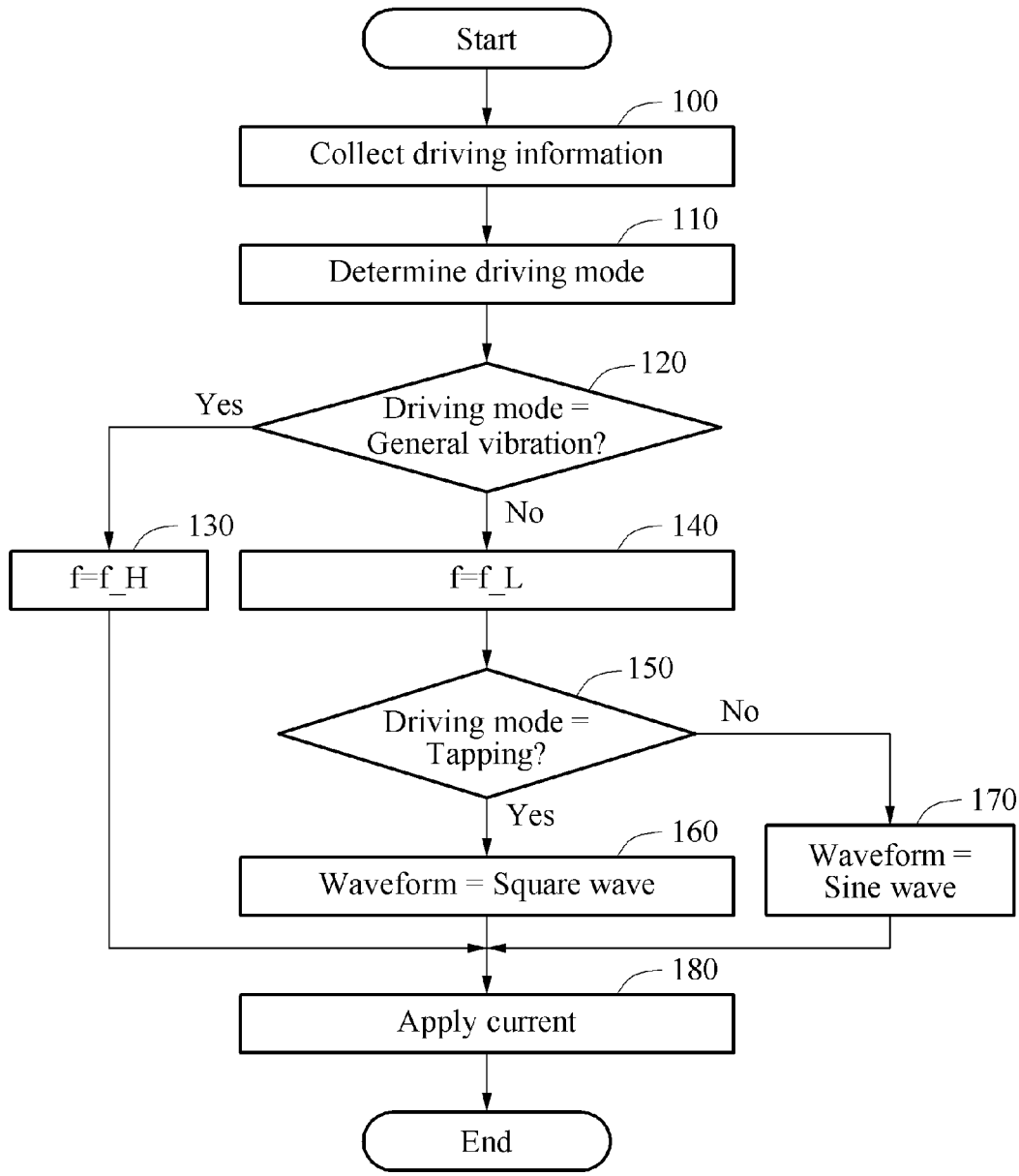
FIG. 9 illustrates a control method for a tactile actuator according to an embodiment.
Figure 10:
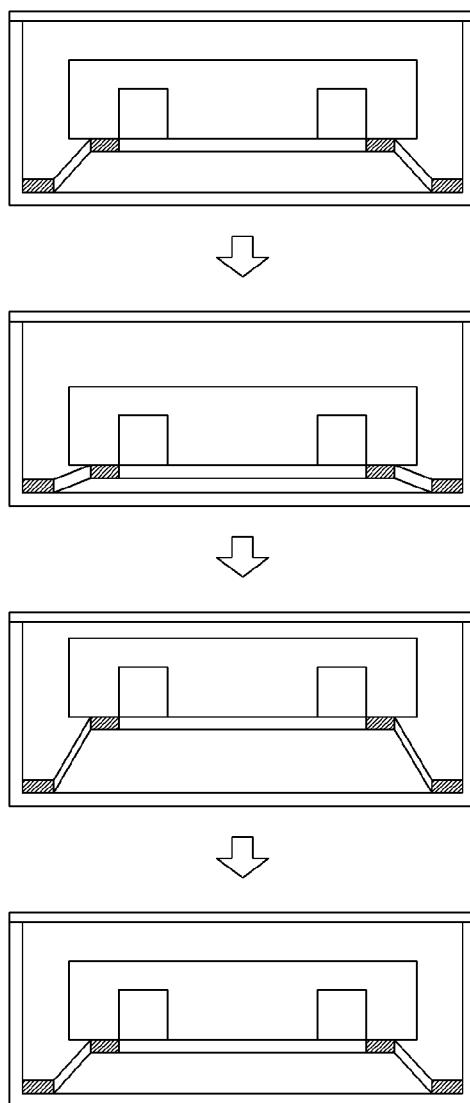
FIG. 10 illustrates an example of a tactile actuator operating in a first set mode according to an embodiment.
Figure 11:
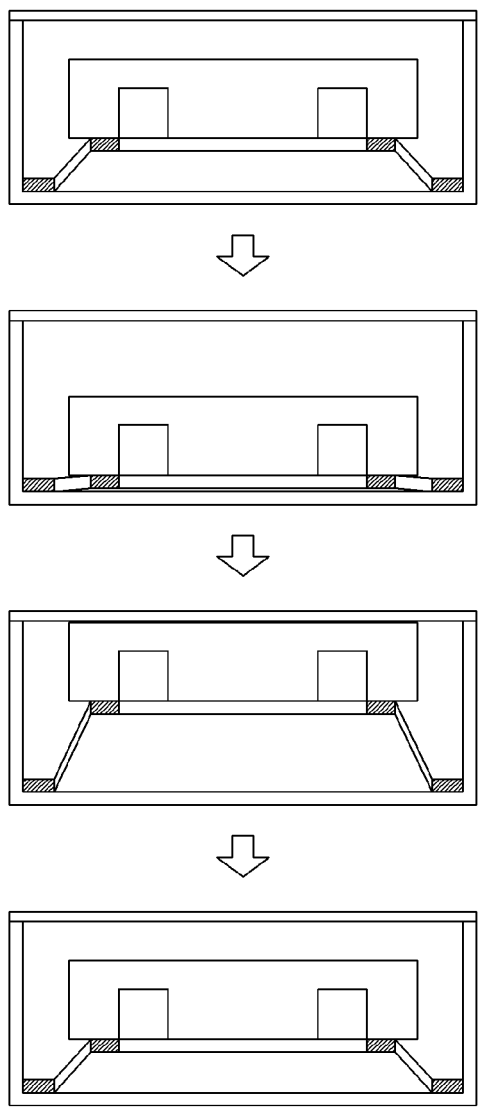
FIG. 11 illustrates another example of a tactile actuator operating in a second set mode according to an embodiment.

FIG. 9 illustrates a control method for a tactile actuator according to an embodiment, FIG. 10 illustrates an example of an operation of the tactile actuator according to an embodiment, and FIG. 11 illustrates another example of an operation of the tactile actuator according to an embodiment.

Referring to FIG. 9 through 11, driving information input through the information providing device 16, 17, 18, 19 may be collected by the controller 20, in operation 100. Based on the driving information collected in operation 100, the controller 20 may determine one of a plurality of preset driving modes, in operation 110. Here, the plurality of preset driving modes may include, for example, a general vibration mode, a tapping mode, and/or a rolling mode. Hereinafter, a case in which a first set mode is the general vibration mode, a second set mode is the tapping mode, and a third set mode is the rolling mode will be described.

For example, the driving information may be an image or a sound to be played back in a device connected to the tactile actuator 1. In operation 110, the driving mode may be determined in real time based on whether the image or the sound to be played back includes a preset image pattern or a preset audio pattern.

When the driving mode is determined in operation 110, the controller 20 may determine a frequency of a current to be applied to the coil 15 based on the determined driving mode.

Whether the driving mode determined in operation 110 is the general vibration mode may be determined, in operation 120. When the determined driving mode is the first set mode (general vibration mode), the controller 20 may determine the frequency of the current to be a first set frequency f_H higher than a threshold frequency, which is a minimum frequency to form a vibration force with a shape of a periodic sine wave, in operation 130. The controller 20 may apply the current of the set frequency to the coil 15, in operation 180. The first set frequency f_H may be set to be a value belonging to the frequency band A11 of FIG. 5 around the resonant frequency of the tactile actuator 1. For example, the first set frequency f_H may be a value below 160 Hz.

When the current having the first set frequency f_H is applied in operation 180, the vibrator 13 may vibrate up and down in the accommodation space of the housing 11, as shown in FIG. 10. The vibration may be transmitted to the user sequentially through the elastic member 14, the housing 11, and the cap 12. In the first set mode, a frequency high enough to form a periodic vibration force may be input. Thus, similar vibration may be generated without being affected greatly by a type of an input waveform. That is, the type of the input waveform in the first set mode is not limited.

Meanwhile, when the driving mode determined in operation 110 is a set mode other than the first set mode, the controller 20 may determine the frequency of the current to be the second set frequency f_L which is lower than the first set frequency f_H, in operation 140. The second set frequency f_L may be determined to be a value lower than the threshold frequency. For example, the second frequency f_L may be a value below ⅓ the resonant frequency of the tactile actuator 1.

After operation 140 is performed, the controller 20 may determine whether the driving mode is the second set mode (tapping mode), in operation 150. When the driving mode is determined to be the second set mode (tapping mode) in operation 150, the controller 20 may determine a waveform of the current to be a square wave or a pulse wave. Conversely, when the driving mode is determined to be the third set mode (rolling mode) in operation 150, the controller 20 may determine the waveform of the current to be a sine wave. The controller 20 may apply the current of the set frequency and the set waveform to the coil 15, in operation 180.

When the current having the second set frequency f_L is applied in operation 180, the vibrator 13 may not form a periodic vibration force, and thus transmit a different tactile sense to the user based on the input waveform, as described below.

First, in a case in which the waveform of the input current is a sine wave, the vibrator 13 not forming a periodic vibration force may move up and down aperiodically. In addition, due to a characteristic of the sine wave, an intensity of the current input into the coil 15 may change gently. Thus, the user may feel a tactile sense of rolling through the above motion. Herein, "rolling" may be construed as collectively referring to a series of aperiodic tactile senses. When applying the above conditions to a prototype in practice, the user felt a tactile sense of rolling.

Next, in a case in which the waveform of the input current is a square wave or a pulse wave, the vibrator 13 not forming a periodic vibration force may similarly move up and down aperiodically. However, due to a characteristic of the square wave or the pulse wave, the intensity of the current input into the coil 15 may change radically. Thus, at each periodic instant at which the intensity of the current changes, an acceleration in a direction in which the vibrator 13 moves up and down may change much greatly, when compared to other sections. A tactile sense that the user feels at an instant at which the intensity of the current changes may increase a threshold value of a sense of touch of the user, which may cause a sensory adaptation such that the user may not feel a tactile sense in remaining sections. Thus, the user may feel a tactile sense of "tapping". Herein, "tapping" may be construed as collectively referring to a tactile sense of periodically repeating an impulse high enough to be more distinguishing than the remaining sections. When applying the above conditions to a prototype in practice, the user felt a tactile sense of tapping.

That is, when a current having a frequency below ⅓ the resonant frequency of the tactile actuator 1 is input, the user may feel at least two different tactile senses based on a waveform of the current.

Meanwhile, for example, in a case in which a distance between the vibrator 13 and the cap 12 is sufficiently close, or a sufficient voltage is input, the vibrator 13 may be in direct contact with the cap 12, as shown in FIG. 11, thereby transmitting a force directly to the user through the cap 12.

Hereinafter, graphs showing experiment results using the tactile actuator 1 will be described in detail.

Figure 12:
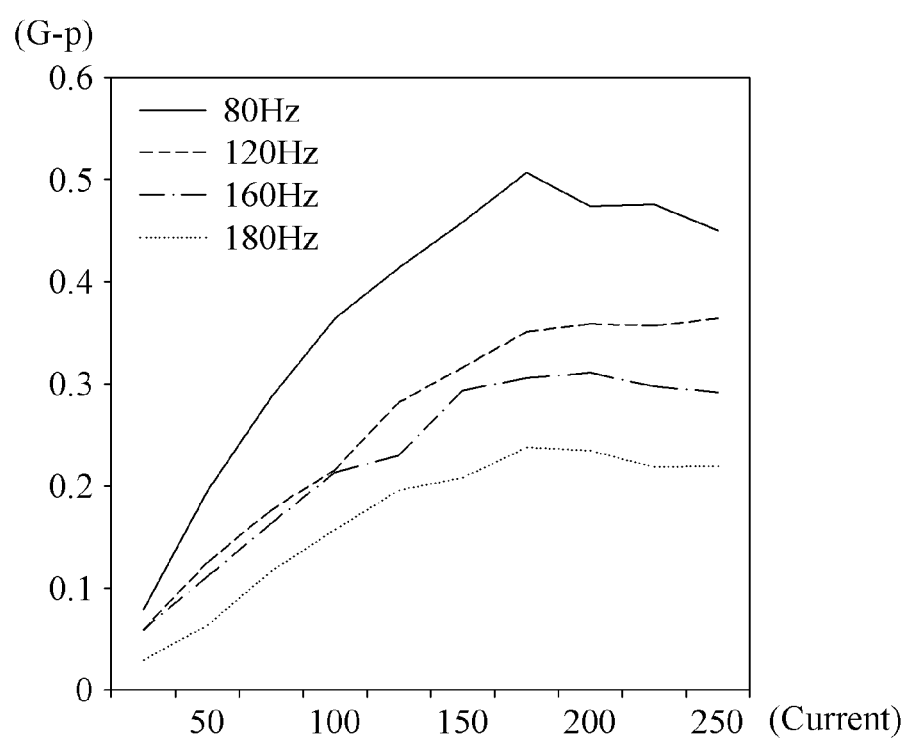
FIG. 12 is a graph illustrating a change in an acceleration with respect to a change in an intensity of a square wave input current of 5 hertz (Hz), in tactile actuators having different resonant frequencies.
Figure 13:
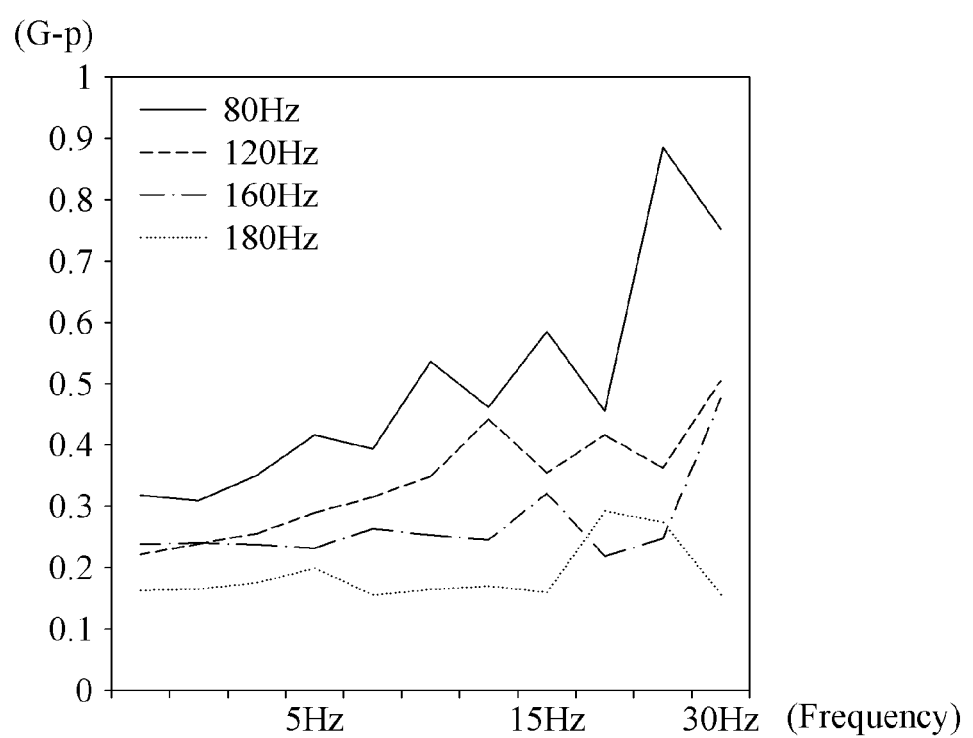
FIG. 13 is a graph illustrating a change in an acceleration with respect to a change in a frequency of a square wave input current of 90 milliamperes (mA), in tactile actuators having different resonant frequencies.
Figure 14:
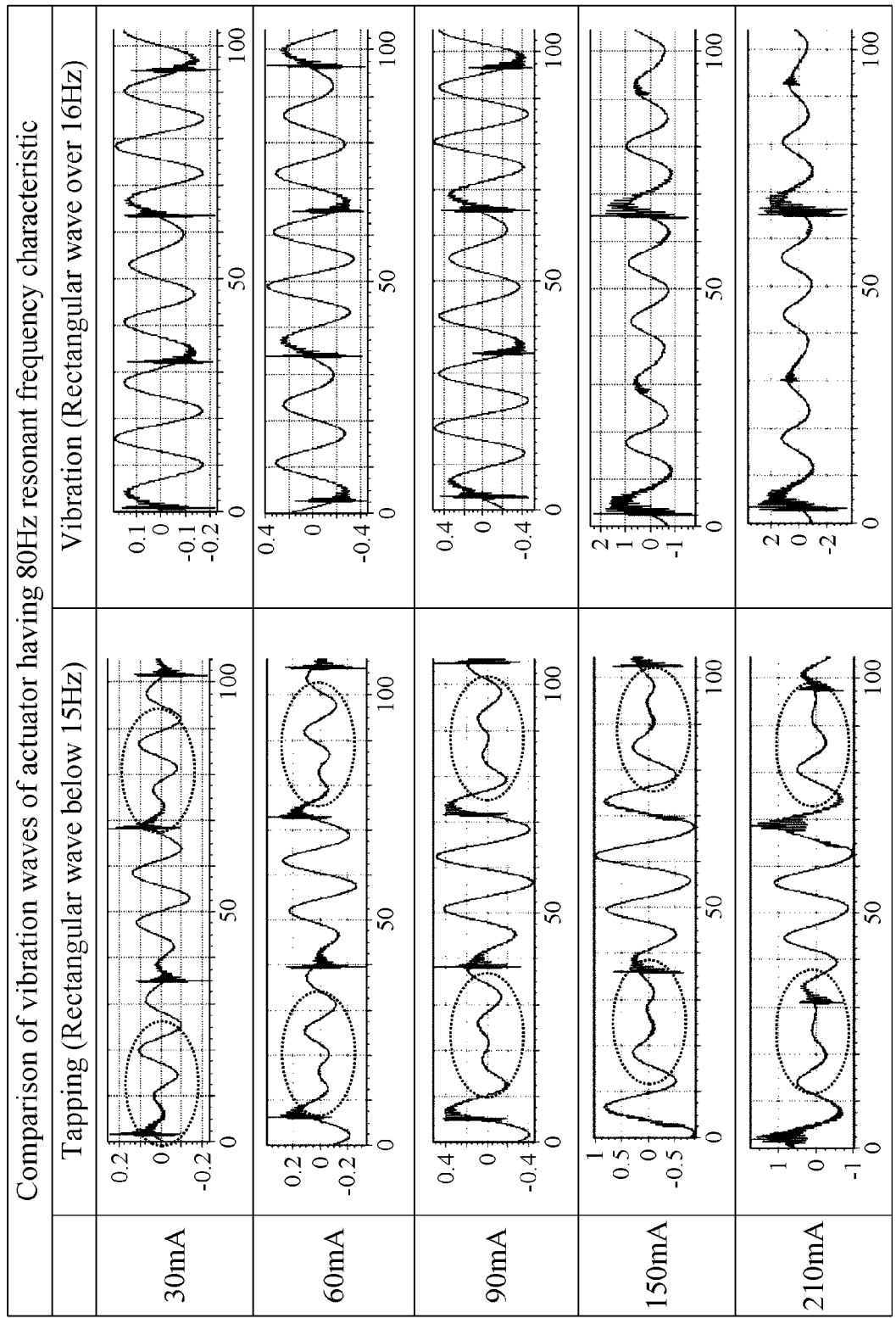
FIG. 14 illustrates waveforms of a vibrator exhibited in response to a change in a square wave current input into a tactile actuator having a resonant frequency characteristic of 80 Hz.
Figure 15:
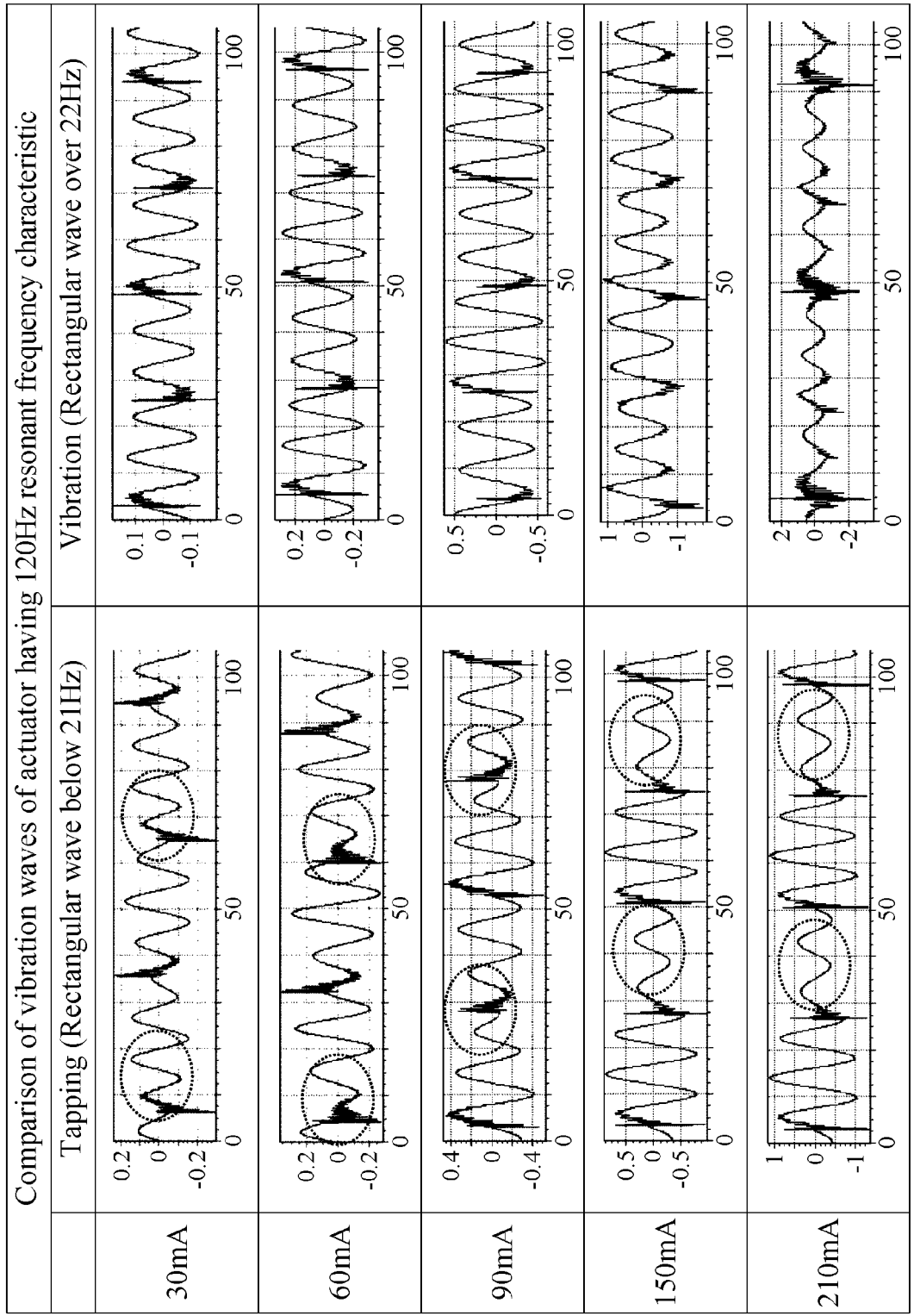
FIG. 15 illustrates waveforms of a vibrator exhibited in response to a change in a square wave current input into a tactile actuator having a resonant frequency characteristic of 120 Hz.
Figure 16:
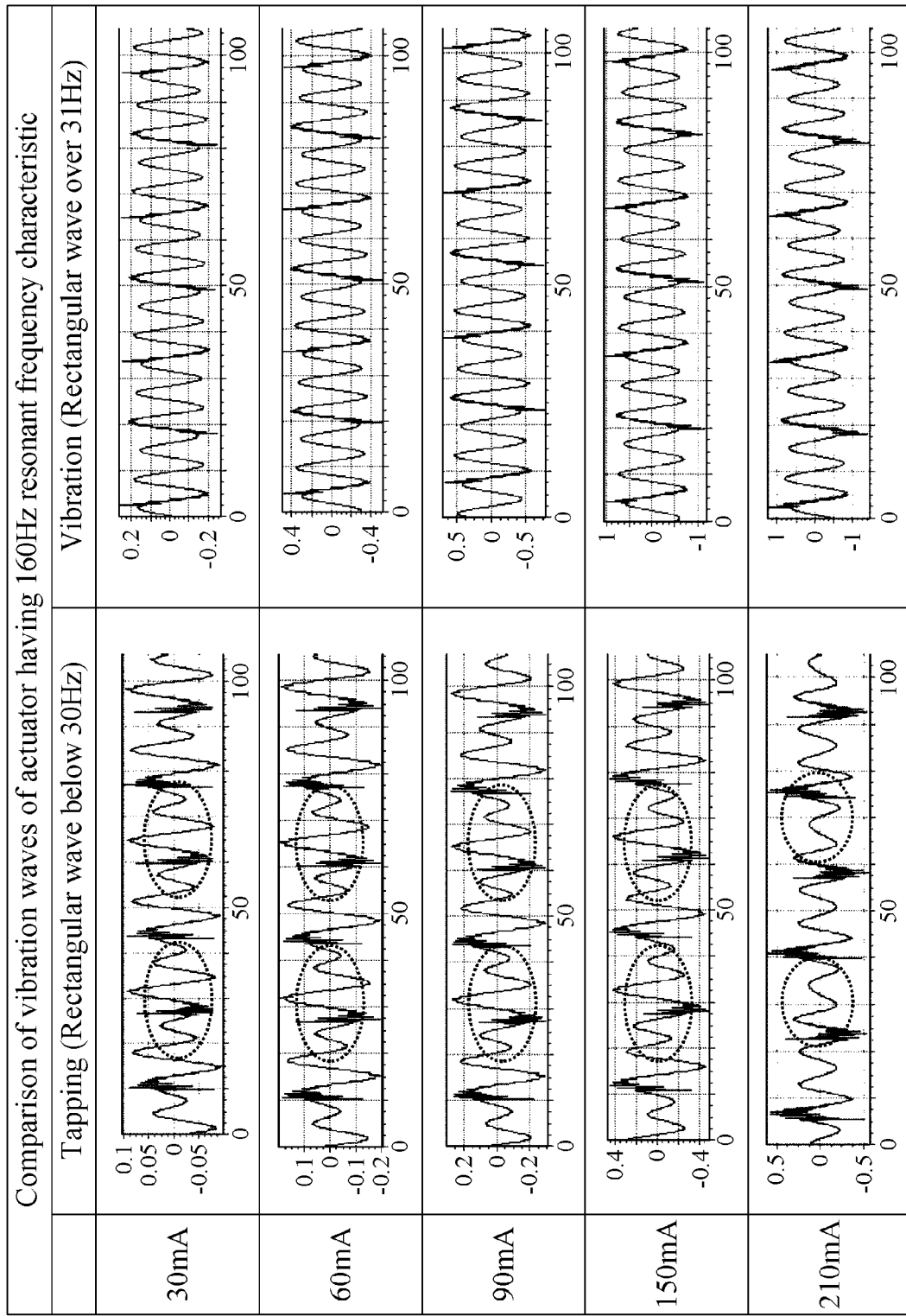
FIG. 16 illustrates waveforms of a vibrator exhibited in response to a change in a square wave current input into a tactile actuator having a resonant frequency characteristic of 160 Hz.
Figure 17:
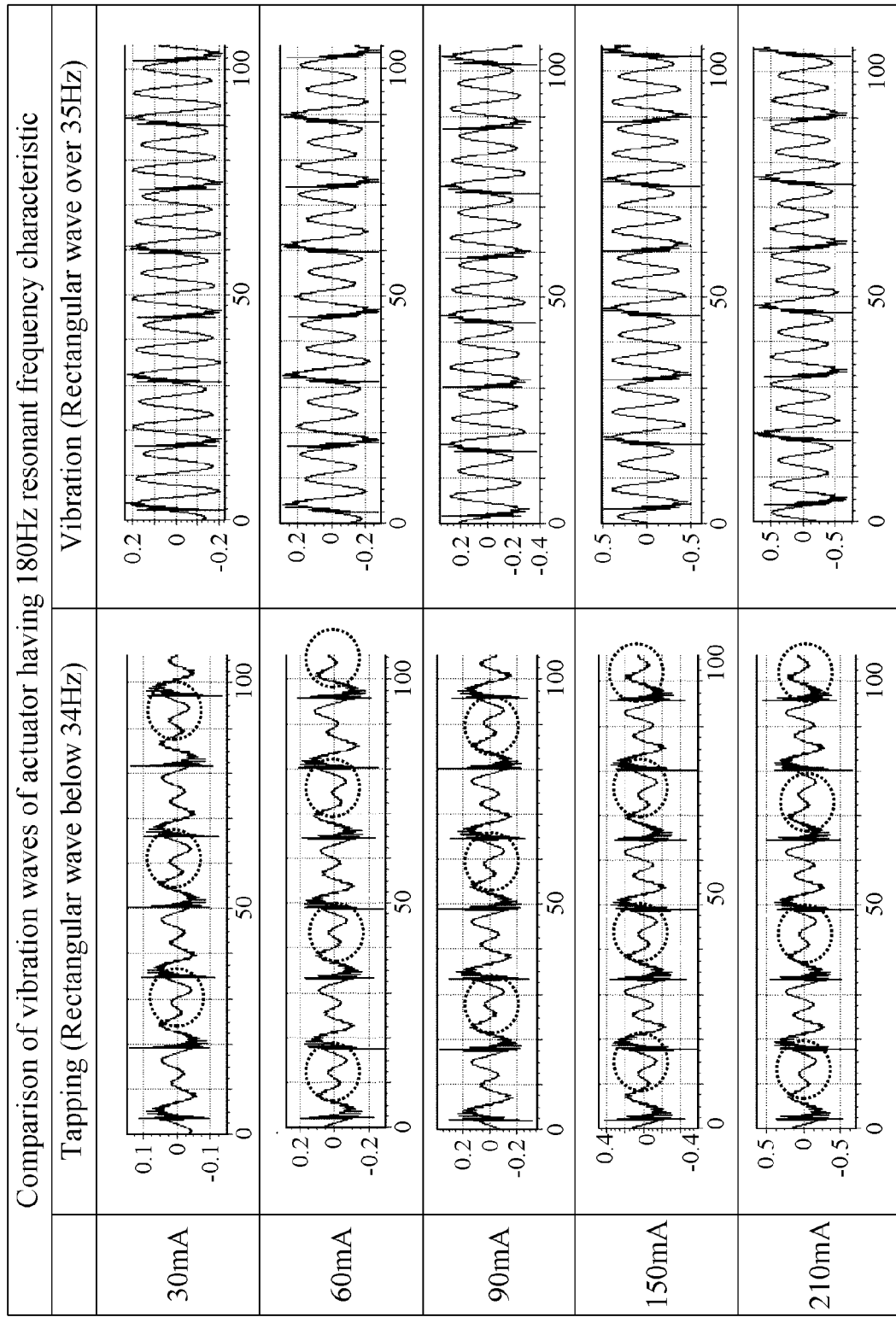
FIG. 17 illustrates waveforms of a vibrator exhibited in response to a change in a square wave current input into a tactile actuator having a resonant frequency characteristic of 180 Hz.

FIG. 12 is a graph illustrating a change in an acceleration with respect to a change in an intensity of a square wave input current of 5 hertz (Hz), in tactile actuators having different resonant frequencies, and FIG. 13 is a graph illustrating a change in an acceleration with respect to a change in a frequency of a square wave input current of 90 milliamperes (mA), in the tactile actuators having different resonant frequencies.

Through the experiments, it was learned that a user may feel a tactile sense of tapping when the vibrator 13 operates with an acceleration of 0.2 G. Referring to FIGS. 12 and 13, in a case in which the resonant frequency of the tactile actuator 1 is below 160 Hz, the vibrator 13 may operate with an acceleration over 0.2 G although a current with an intensity of 90 mA and a frequency of 5 Hz is applied. Conversely, in a case in which the resonant frequency of the tactile actuator is 180 Hz which is a bit greater than 160 Hz, a current over 130 mA which is about 1.5 times 90 mA may need to be applied such that the vibrator 13 may operate with an acceleration over 0.2 G.

In a case in which a mass of the vibrator 13 is below 2 g, the tactile actuator may set an elasticity coefficient of the elastic member 14 to be below 2.021 N/mm, thereby setting the resonant frequency to be below 160 Hz. Meanwhile, in a case in which the mass of the vibrator 13 is over 2 g, the tactile actuator may set the elasticity coefficient of the elastic member 14 to be over 2.021 N/mm, thereby setting the resonant frequency to be below 160 Hz.

Figure 18:
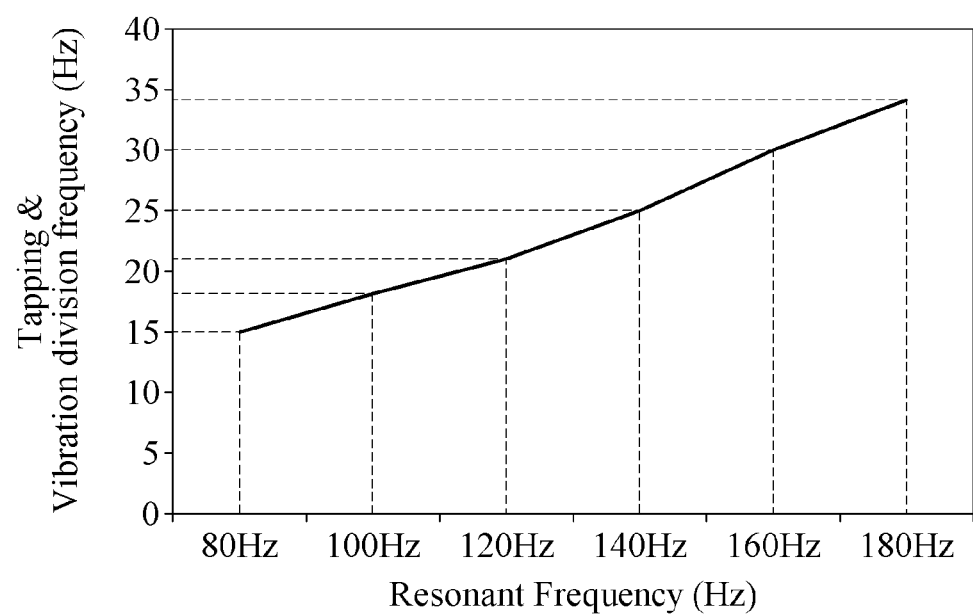
FIG. 18 is a graph illustrating threshold frequencies of tapping and vibration when a square wave current is applied, in tactile actuators having different resonant frequencies.
Figure 19:
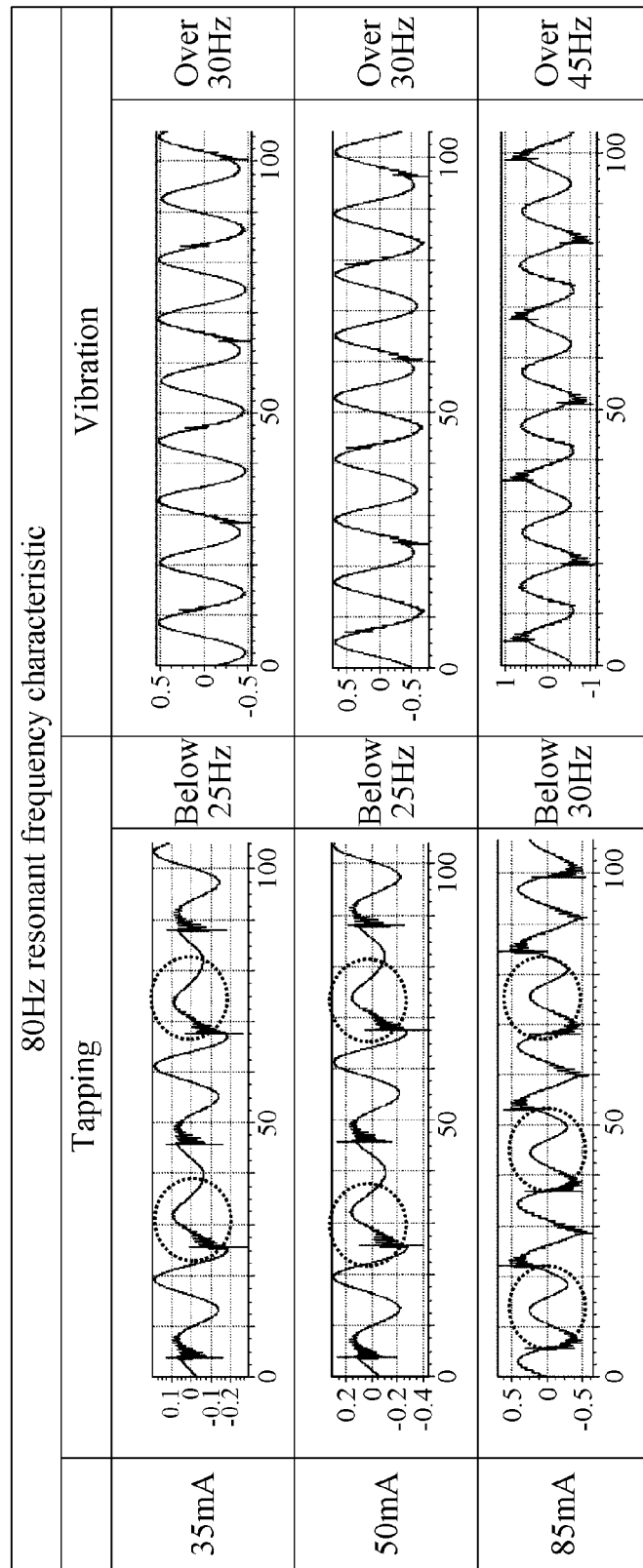
FIG. 19 illustrates waveforms of a vibrator exhibited in response to a change in a pulse wave current input into a tactile actuator having a resonant frequency characteristic of 80 Hz.
Figure 20:
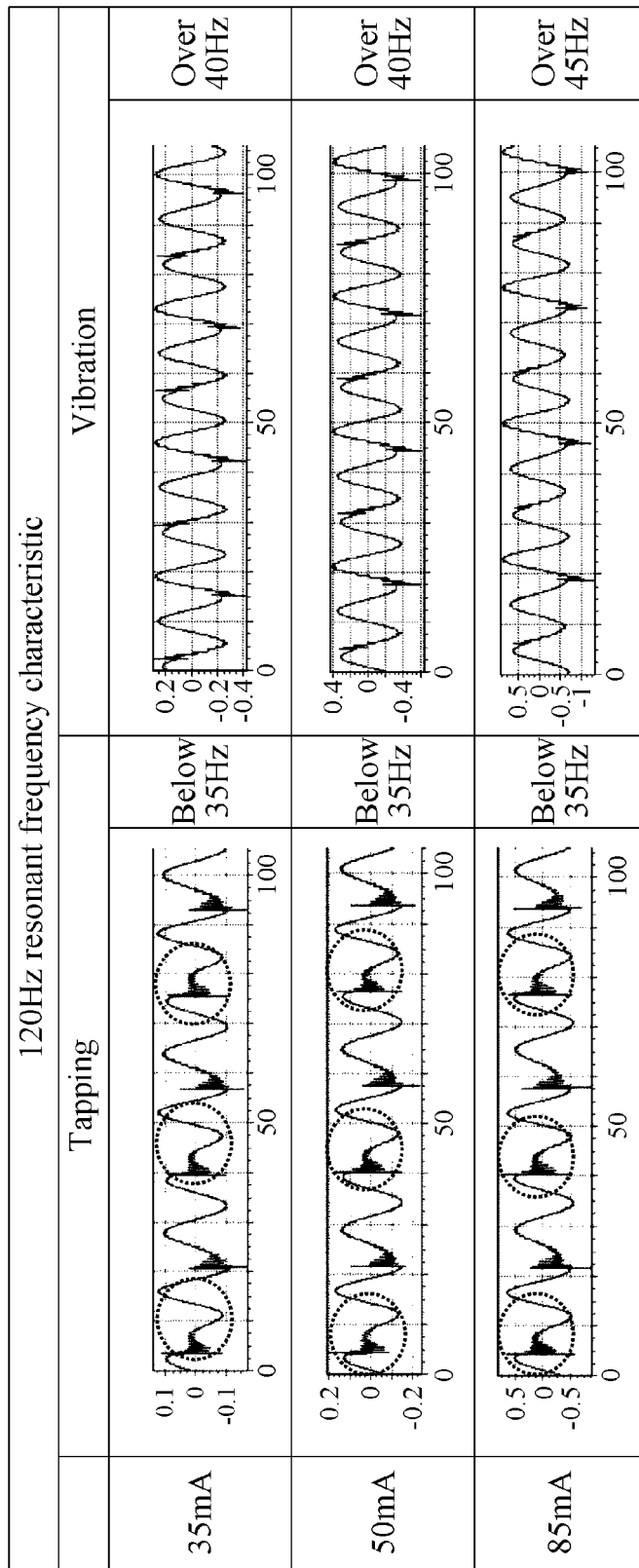
FIG. 20 illustrates waveforms of a vibrator exhibited in response to a change in a pulse wave current input into a tactile actuator having a resonant frequency characteristic of 120 Hz.
Figure 21:
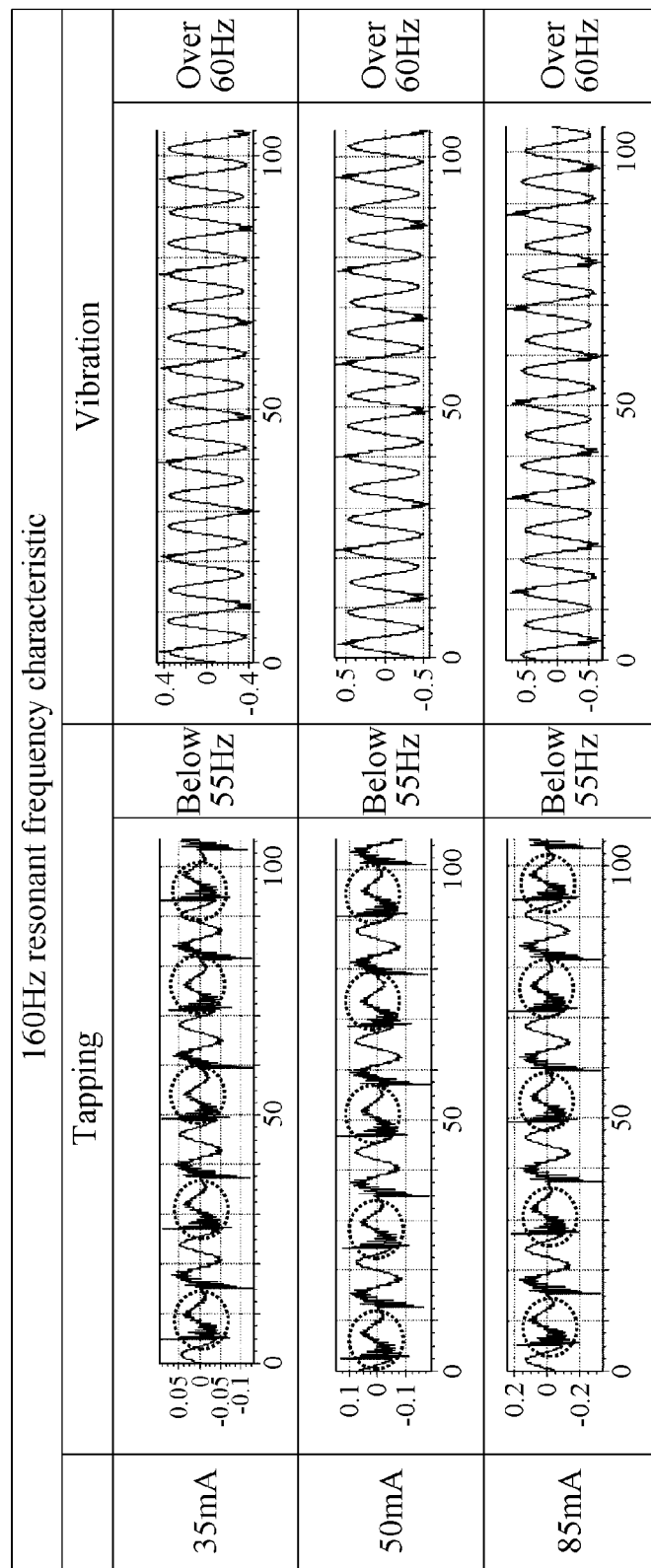
FIG. 21 illustrates waveforms of a vibrator exhibited in response to a change in a pulse wave current input into a tactile actuator having a resonant frequency characteristic of 160 Hz.
Figure 22:
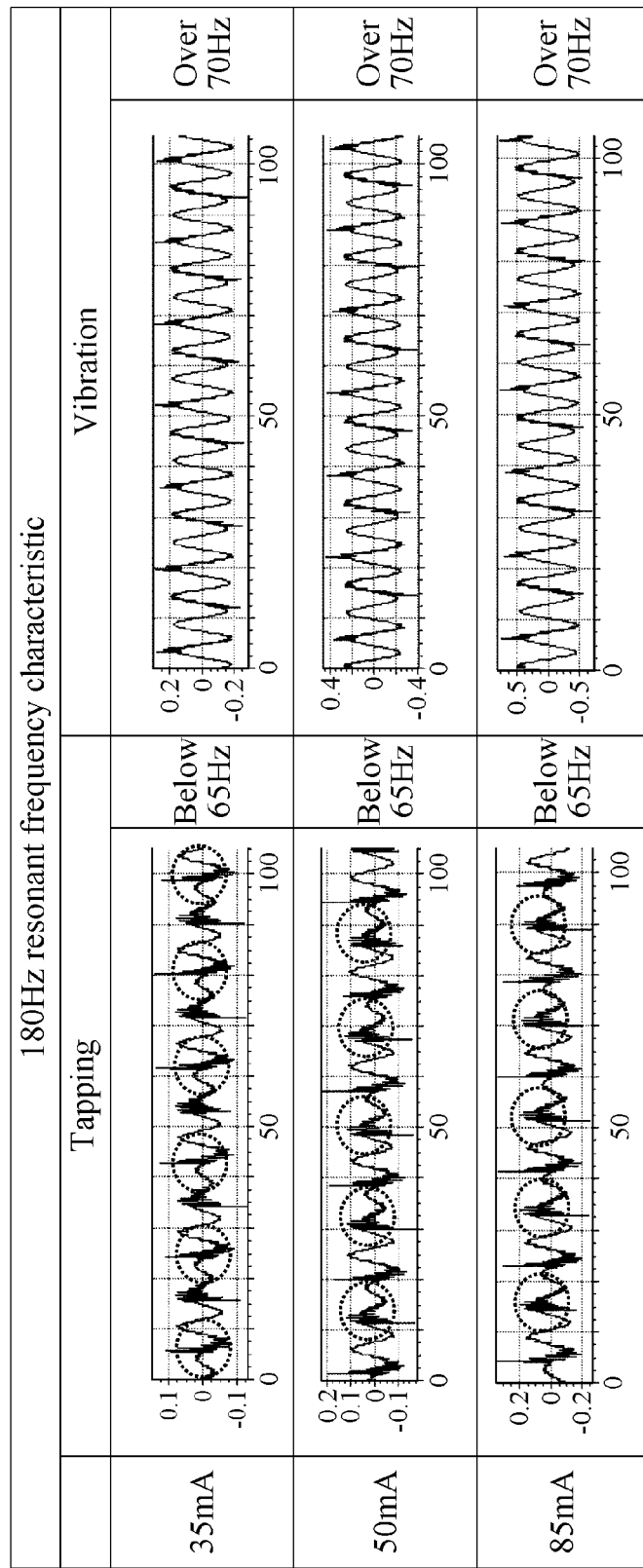
FIG. 22 illustrates waveforms of a vibrator exhibited in response to a change in a pulse wave current input into a tactile actuator having a resonant frequency characteristic of 180 Hz.

FIGS. 14 through 17 illustrate waveforms of vibrators exhibited in response to a change in a square wave current input into tactile actuators having resonant frequency characteristics of 80 Hz, 120 Hz, 160 Hz, and 180 Hz, respectively, and FIG. 18 is a graph illustrating threshold frequencies of tapping and vibration when a square wave current is applied, in the tactile actuators having different resonant frequencies.

Referring to FIGS. 14 through 17, when a square wave current over a predetermined frequency is applied, a vibrator may form a vibration force of a shape of a sine wave which is a periodic waveform, as shown in the graphs in the right column of each drawing. Thus, under the above conditions, the tactile actuator may provide a tactile sense of "vibration" to the user.

Conversely, as shown in the graphs in the left column of each drawing, the vibrator may not form a periodic vibration force in a region below the predetermined frequency, and the graphs partially collapse. However, due to a characteristic of the square wave, at each periodic instance at which the intensity of the current changes, an acceleration of the vibrator may change much greatly, when compared to other sections. Thus, under the above conditions, the tactile actuator may provide a tactile sense of "tapping" to the user.

As described above, the tactile sense that the tactile actuator provides to the user may be divided as vibration or tapping based on the predetermined frequency. The predetermined frequency may also be referred to as a threshold frequency or a division frequency.

Referring to FIGS. 14 through 17, as the resonant frequency of the tactile actuator increases, the threshold frequency may also increase, which is shown in FIG. 18. In a control method for the tactile actuator, the first set frequency f_H and the second set frequency f_L may be set based on the threshold frequency of FIG. 18.

Figure 23:
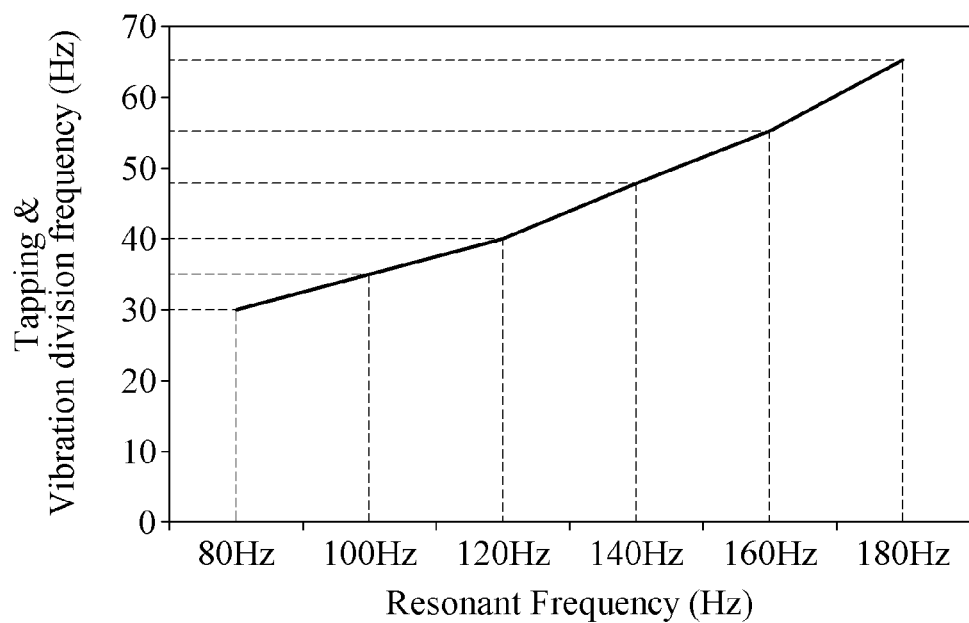
FIG. 23 is a graph illustrating threshold frequencies of tapping and vibration when a pulse wave current is applied, in tactile actuators having different resonant frequencies.
Figure 24:
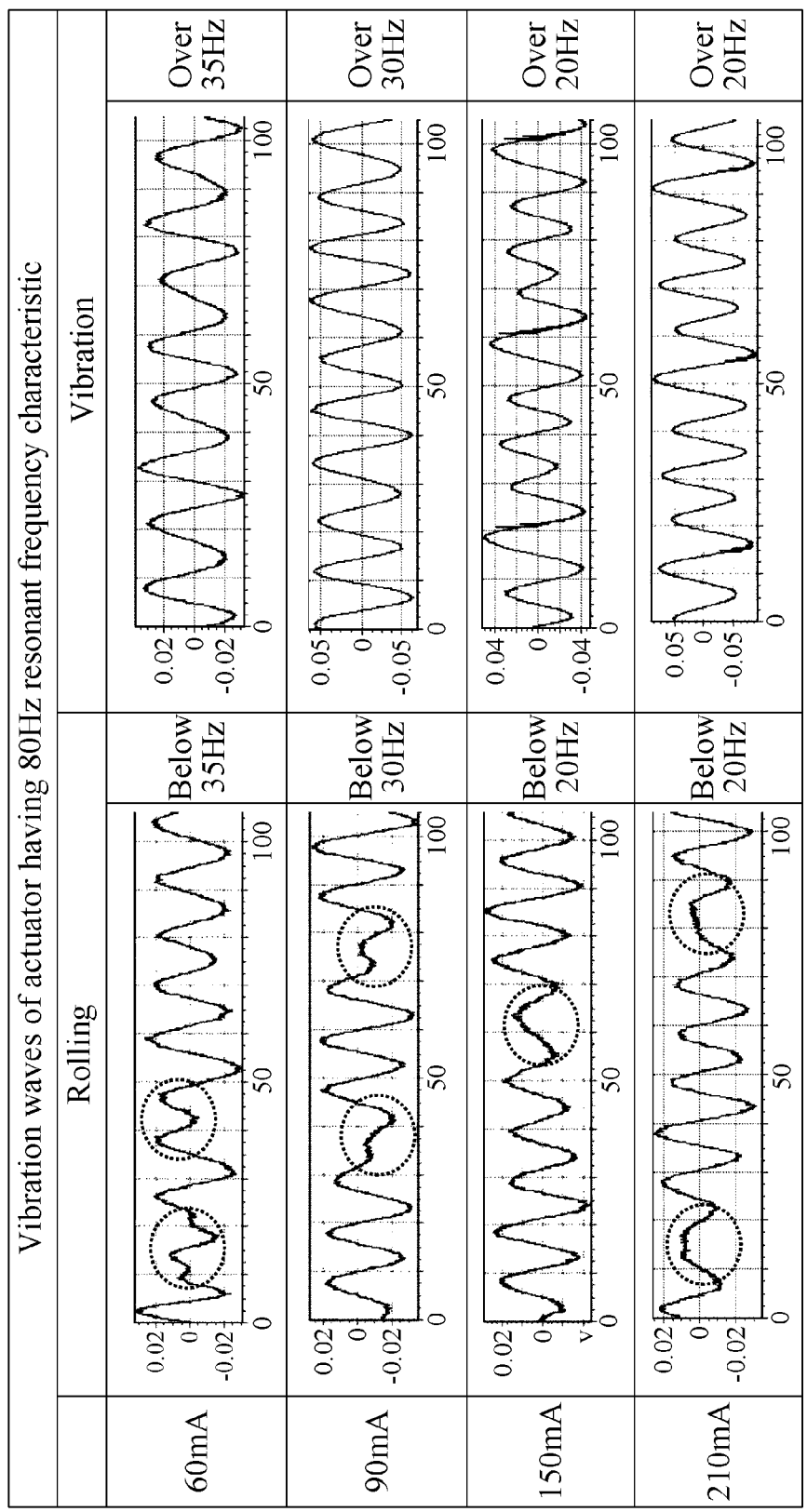
FIG. 24 illustrates waveforms of a vibrator exhibited in response to a change in a sine wave current input into a tactile actuator having a resonant frequency characteristic of 80 Hz.
Figure 25:
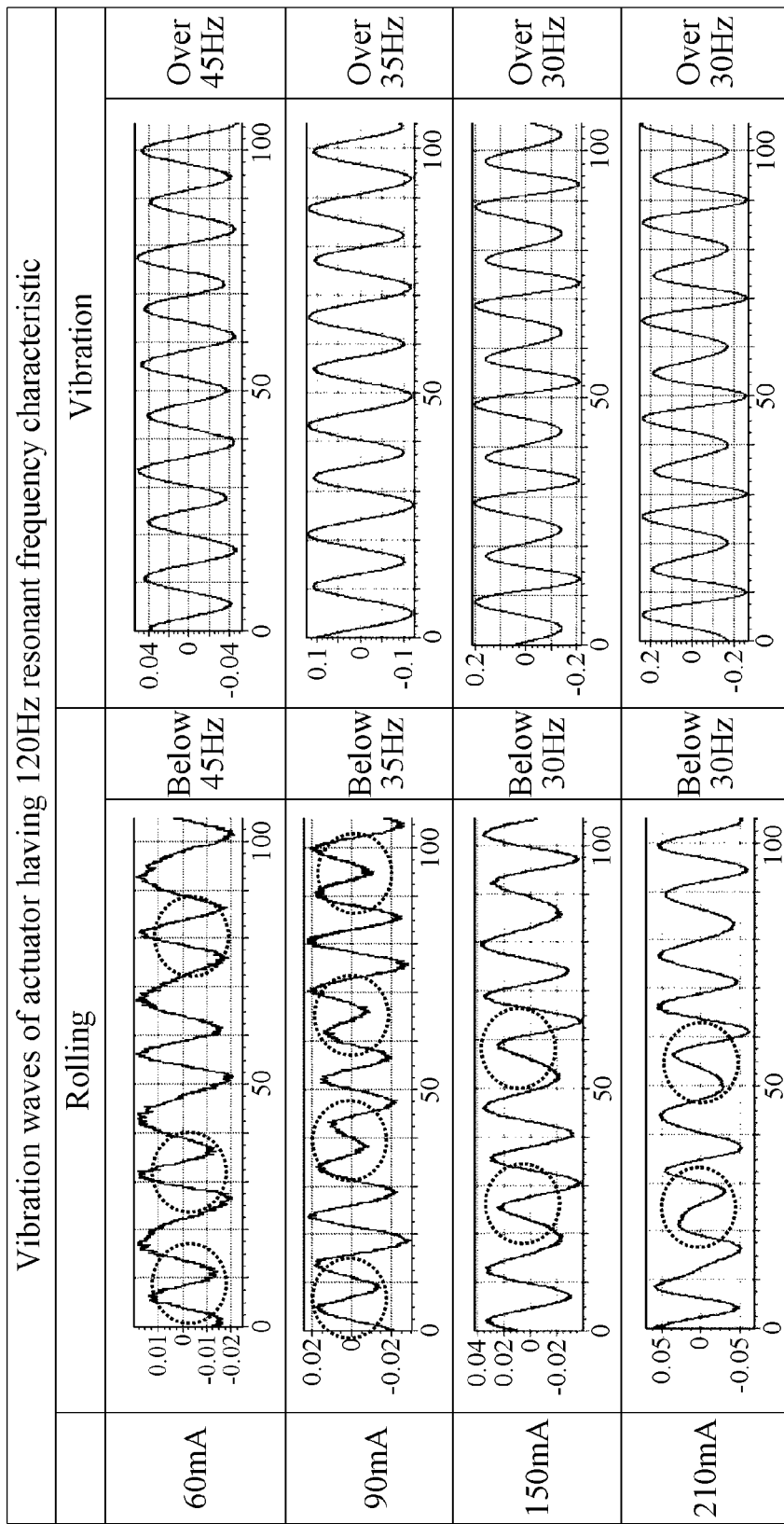
FIG. 25 illustrates waveforms of a vibrator exhibited in response to a change in a sine wave current input into a tactile actuator having a resonant frequency characteristic of 120 Hz.
Figure 26:
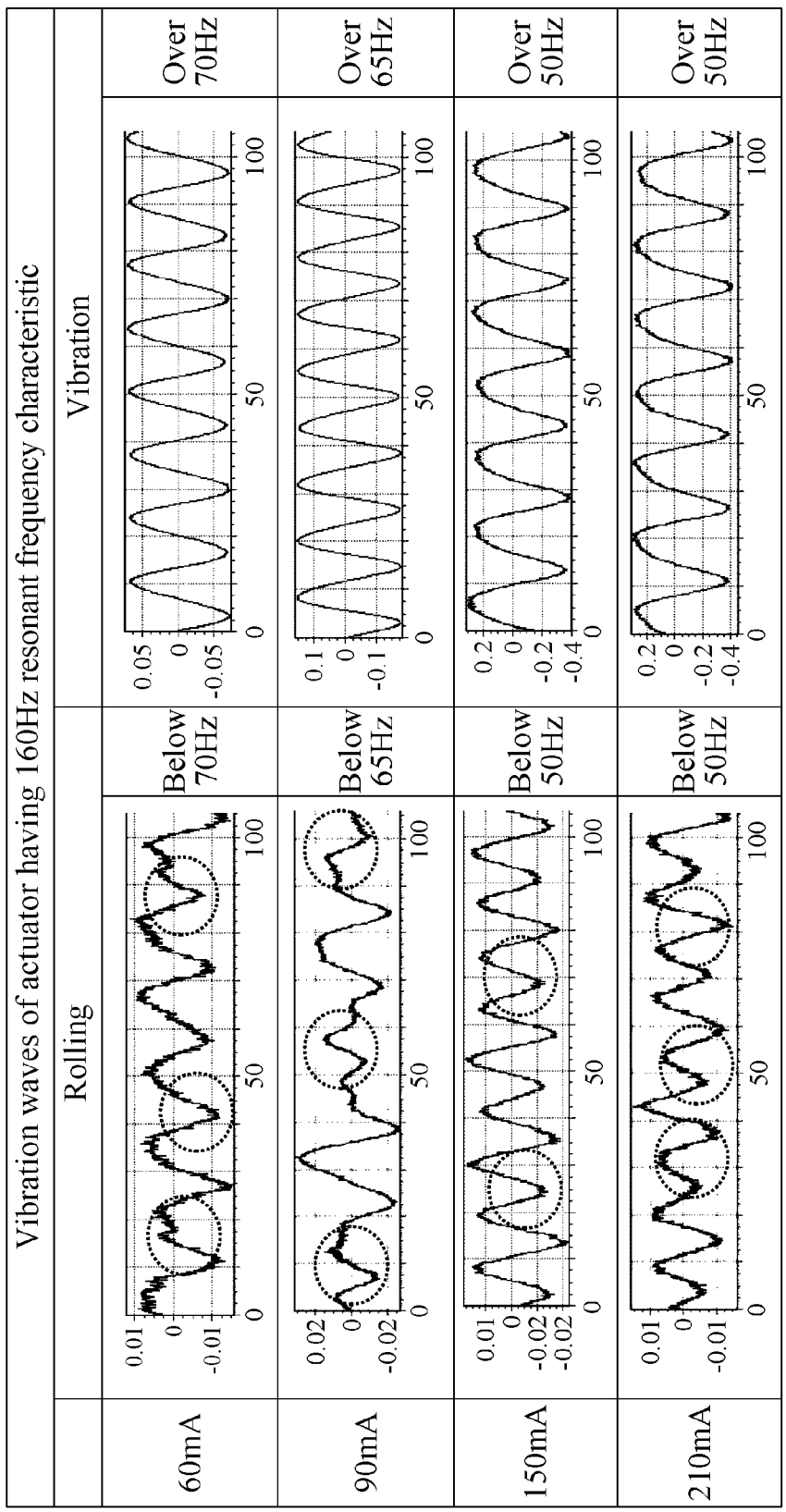
FIG. 26 illustrates waveforms of a vibrator exhibited in response to a change in a sine wave current input into a tactile actuator having a resonant frequency characteristic of 160 Hz.
Figure 27:
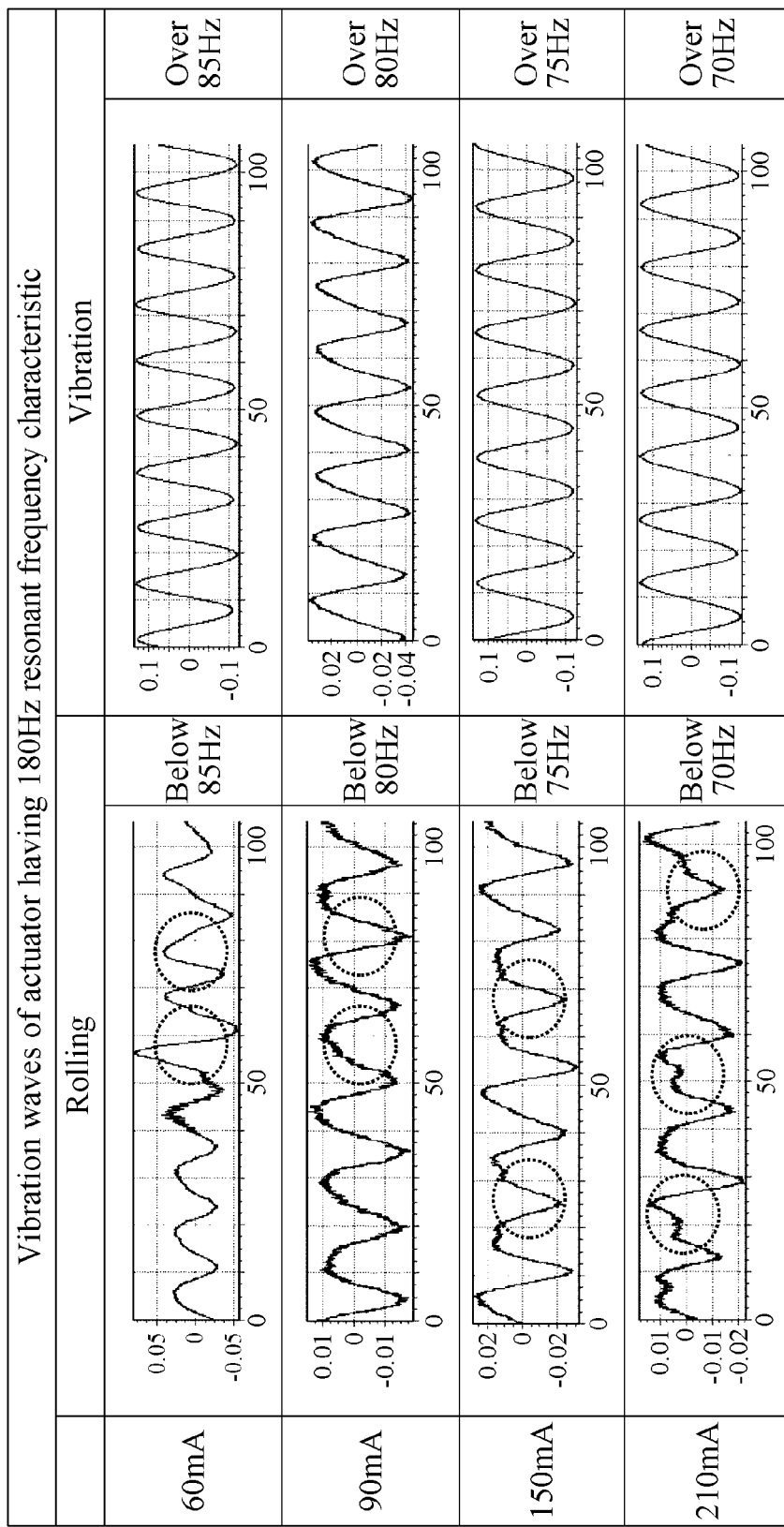
FIG. 27 illustrates waveforms of a vibrator exhibited in response to a change in a sine wave current input into a tactile actuator having a resonant frequency characteristic of 180 Hz.

FIGS. 19 through 22 illustrate waveforms of vibrators exhibited in response to a change in a pulse wave current input into tactile actuators having resonant frequency characteristics of 80 Hz, 120 Hz, 160 Hz, and 180 Hz, respectively, and FIG. 23 is a graph illustrating threshold frequencies of tapping and vibration when a pulse wave current is applied, in the tactile actuators having different resonant frequencies.

Referring to FIGS. 19 through 22, when a pulse wave current is input, a vibrator may have a similar waveform to a case in which a square wave current is input. Thus, when a pulse wave current below a threshold frequency is applied to the tactile actuator, the tactile actuator may provide a tactile sense of "tapping" to the user. When a pulse wave current over the threshold frequency is applied to the tactile actuator, the tactile actuator may provide a tactile sense of "vibration" to the user.

Referring to FIGS. 19 through 22, as the resonant frequency of the tactile actuator increases, the threshold frequency may also increase, which is shown in FIG. 23.

Meanwhile, with respect to the tactile actuator having the same resonant frequency, a threshold frequency when inputting a pulse wave current may be about two times a threshold frequency when inputting a square wave current.

In a control method for the tactile actuator, the first set frequency f_H and the second set frequency f_L may be set based on the threshold frequency of FIG. 23.

Figure 28:
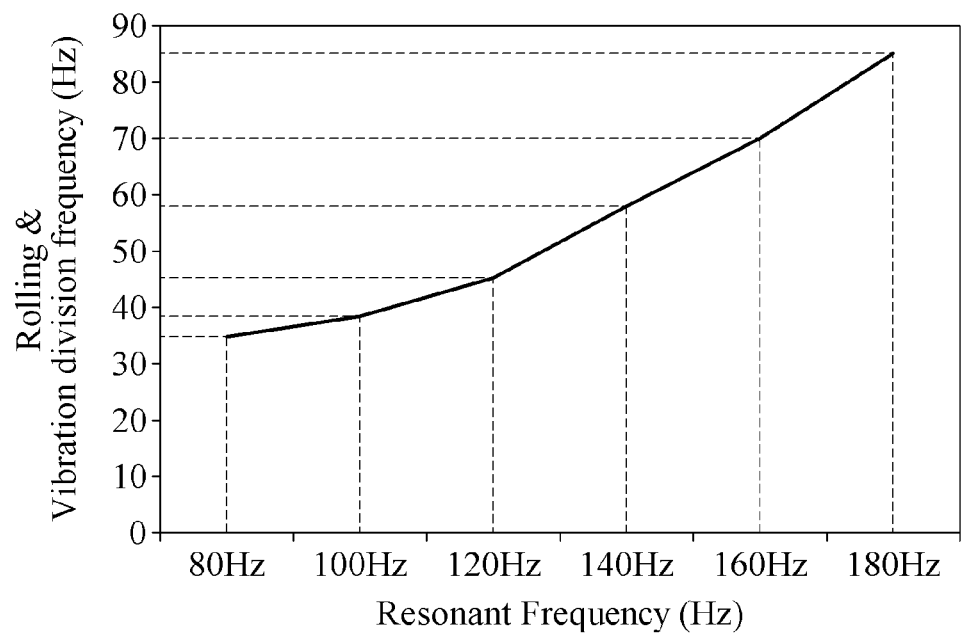
FIG. 28 is a graph illustrating threshold frequencies of rolling and vibration when a sine wave current is applied, in tactile actuators having different resonant frequencies.

FIGS. 24 through 27 illustrate waveforms of vibrators exhibited in response to a change in a sine wave current input into tactile actuators having resonant frequency characteristics of 80 Hz, 120 Hz, 160 Hz, and 180 Hz, respectively, and FIG. 28 is a graph illustrating threshold frequencies of rolling and vibration when a sine wave current is applied, in the tactile actuators having different resonant frequencies.

Referring to FIGS. 24 through 27, when a sine wave current over a predetermined frequency is applied, a vibrator may form a vibration force of a shape of a sine wave which is a periodic waveform, as shown in the graphs in the right column of each drawing. Thus, under the above conditions, the tactile actuator may provide a tactile sense of "vibration" to the user.

Conversely, as shown in the graphs in the left column of each drawing, the vibrator may not form a periodic vibration force in a region below the predetermined frequency, and the graphs partially collapse. The vibrator not forming a periodic vibration force may have an acceleration of a vertical motion aperiodically. Meanwhile, due to a characteristic of the sine wave, an intensity of the current may change gently, and thus the user may feel a tactile sense of "rolling" through the above motion.

As described above, the tactile sense that the tactile actuator provides to the user may be divided as vibration or rolling based on the predetermined frequency.

Referring to FIGS. 24 through 27, as the resonant frequency of the tactile actuator increases, the threshold frequency may also increase, which is shown in FIG. 28. In a control method for the tactile actuator, the first set frequency f_H and the second set frequency f_L may be set based on the threshold frequency of FIG. 28.

Figure 29:
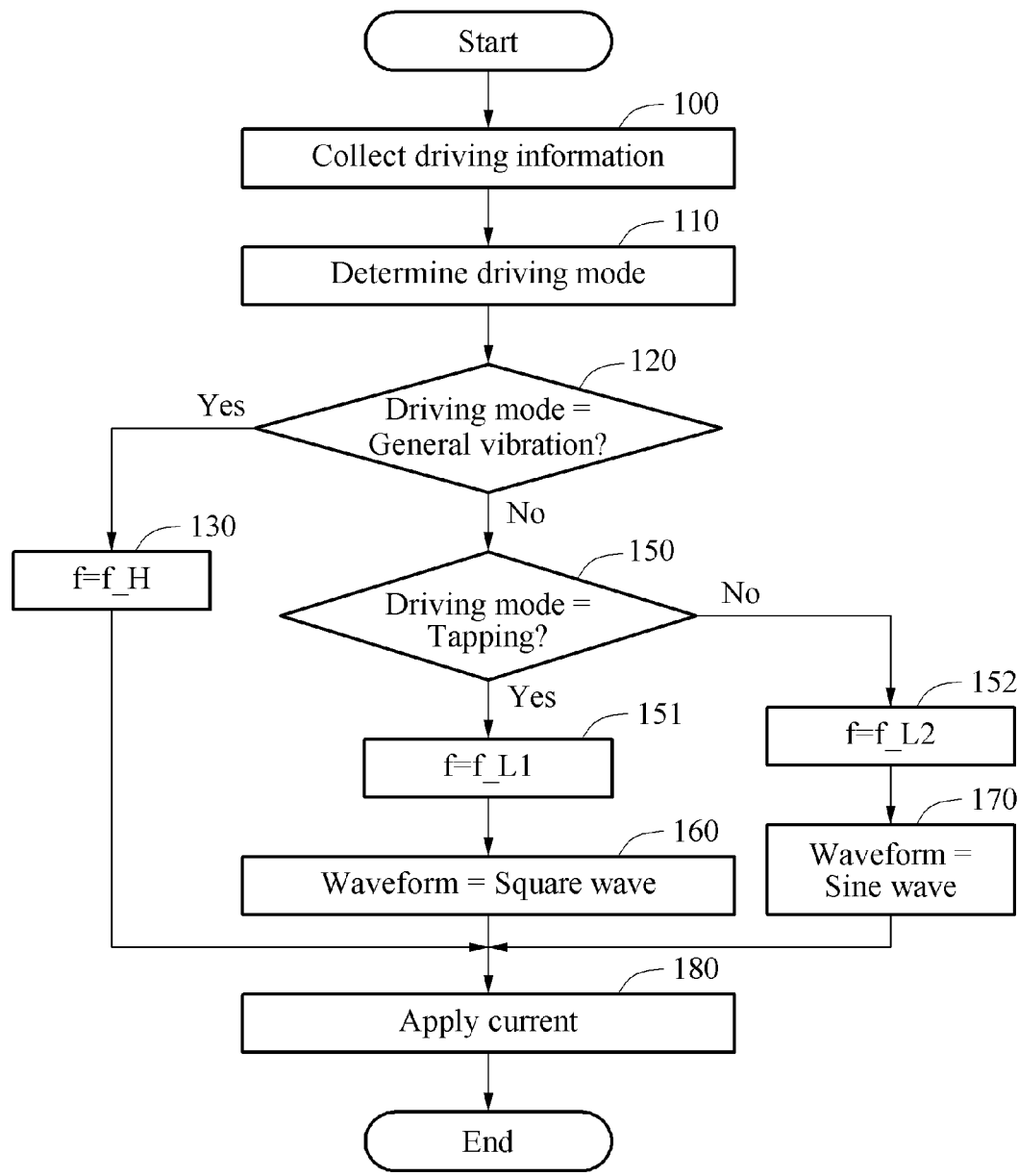
FIG. 29 illustrates a control method for a tactile actuator according to another embodiment.

FIG. 29 illustrates a control method for a tactile actuator according to another embodiment. Unless otherwise disclosed, the description of the control method for the tactile actuator provided with reference to FIG. 9 may also apply to the other embodiment.

Referring to FIG. 29, in a control method for the tactile actuator, when a driving mode is a general vibration mode in operation 120, the controller may determine a frequency of a current to be applied to be a first set frequency f_H. With reference to FIG. 18, 23, or 28, the first set frequency f_H may be set to be a value greater than a first threshold frequency which is a minimum frequency to provide a tactile sense of "vibration" under provide conditions.

When the driving mode is not the general vibration mode in operation 120, the controller may determine whether the driving mode is a tapping mode, in operation 150.

In a case in which the driving mode is the tapping mode in operation 150, the controller may determine the frequency of the current to be applied to be a second set frequency f_L1, in operation 151. With reference to FIG. 18 or 23, the second set frequency f_L1 may be set to be a value less than a second threshold frequency which is a maximum frequency to provide a tactile sense of "tapping" under provided conditions.

In a case in which the driving mode is not the tapping mode in operation 150, the controller may determine the frequency of the current to be applied to be a third set frequency f_L2, in operation 152. With reference to FIG. 28, the third set frequency f_L2 may be set to be a value less than a third threshold frequency which is a maximum frequency to provide a tactile sense of "rolling" under provided conditions.

Meanwhile, as shown in FIGS. 18, 23, and 28, the third threshold frequency which is a maximum frequency to provide a tactile sense of "rolling" may be greater than the second threshold frequency which is a maximum frequency to provide a tactile sense of "tapping" under the same conditions. Thus, the third set frequency f_L2 may be set to be higher than the second set frequency f_L1. Meanwhile, the first set frequency f_H may be set to be a value greater than the second set frequency f_L1 and the third set frequency f_L2. That is, the third set frequency f_L2 may be greater than the second set frequency f_L1, and the first set frequency f_H may be greater than the third set frequency f_L2.

According to the above embodiments, various tactile senses may be transmitted more sensitively. Further, in a frequency range below 160 Hz, of a frequency range that may be sensed by a human body, tactile senses may be provided more efficiently than the existing technology. In addition, through a single tactile device, at least two different tactile senses may be provided within a frequency range below 160 Hz.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A tactile actuator, comprising:
a housing having an accommodation space therein;
a cap configured to cover at least a portion of the accommodation space;
a vibrator disposed in the accommodation space;
an elastic member configured to connect the housing and the vibrator such that the vibrator vibrates with respect to the housing;
a coil configured to form a magnetic field to drive the vibrator; and
a controller configured to determine one of a plurality of preset driving modes based on collected driving information, and determine a characteristic of a current to be applied to the coil based on the determined driving mode,
wherein the controller is configured to:
determine a frequency of the current to be a first set frequency when the driving mode is a first set mode, and
determine the frequency of the current to be a second set frequency when the driving mode is a set mode other than the first set mode, the second set frequency being lower than the first set frequency,
determine a waveform of the current to be a square wave or a pulse wave when the driving mode is a second set mode, and
determine the waveform of the current to be a sine wave when the driving mode is the first set mode,
wherein the first set frequency is equal to or greater than a threshold frequency of the tactile actuator,
wherein the second set frequency is smaller than the threshold frequency of the tactile actuator, and
wherein the threshold frequency is a minimum frequency at which periodic vibration is formed without showing collapse of a waveform generated based on an input current.

2. The tactile actuator of claim 1, wherein a mass of the vibrator is below 2 grams (g), an elasticity coefficient of the elastic member is below 2.021 newtons per millimeter (N/mm), and a resonant frequency of the tactile actuator is below 160 hertz (Hz).

3. The tactile actuator of claim 1, wherein the first set frequency is a value below 160 Hz.

4. The tactile actuator of claim 1, wherein the controller is configured to:
determine the waveform of the current to be a sine wave when the driving mode is a third set mode.

5. The tactile actuator of claim 1, wherein the driving mode includes a general vibration mode, a tapping mode, and a rolling mode.

6. The tactile actuator of claim 5, wherein the controller is configured to:
determine a frequency of the current to be a first set frequency when the driving mode is the general vibration mode,
determine the frequency of the current to be a second set frequency when the driving mode is the tapping mode, the second set frequency being lower than the first set frequency, and
determine the frequency of the current to be a third set frequency when the driving mode is the rolling mode, the third set frequency being higher than the second set frequency and lower than the first set frequency.

7. The tactile actuator of claim 1, further comprising:
an information providing device configured to provide information collected by the controller,
wherein the information providing device comprises at least one of a user interface configured to receive an instruction of a user, a sensor configured to sense an external environment, a memory configured to store data, and a communicator configured to receive information through communication with another communication device.

8. A control method for a tactile actuator including a housing having an accommodation space therein, a cap configured to cover at least a portion of the accommodation space, a vibrator disposed in the accommodation space, an elastic member configured to connect the housing and the vibrator such that the vibrator vibrates with respect to the housing, and a coil configured to form a magnetic field to drive the vibrator, the control method comprising:
collecting driving information;
determining one of a plurality of preset driving modes based on the collected driving information;
determining a frequency of a current to be applied to the coil based on the determined driving mode; and
applying the current to the coil, wherein in the determining a frequency of a current to be applied to the coil, determining a frequency of the current to be a first set frequency when the driving mode is a first set mode, and determining the frequency of the current to be a second set frequency when the driving mode is a set mode other than the first set mode, the second set frequency being lower than the first set frequency, determining a waveform of the current to be a square wave or a pulse wave when the driving mode is a second set mode, and determining the waveform of the current to be a sine wave when the driving mode is the first set mode, wherein the first set frequency is equal to or greater than a threshold frequency of the tactile actuator, wherein the second set frequency is smaller than the threshold frequency of the tactile actuator, and wherein the threshold frequency is a minimum frequency at which periodic vibration is formed without showing collapse of a waveform generated based on an input current.

9. The control method of claim 8, further comprising:
determining a waveform of the current to be applied to the coil based on the determined driving mode.

10. The control method of claim 8, wherein the driving information is an image or a sound to be played back in a device connected to the tactile actuator, and the determining of the driving mode comprises determining the driving mode in real time based on whether the image or the sound includes a preset image pattern or a preset audio pattern.

* * * * *